US012622535B2

(12) United States Patent
Obitts et al.

(10) Patent No.: US 12,622,535 B2
(45) Date of Patent: May 12, 2026

(54) MERCHANDISE ACCESS GATE AND RETAIL MERCHANDISE DISPLAY INCLUDING MERCHANDISE ACCESS GATE

(71) Applicants: Shane Obitts, North Ridgeville, OH (US); Khalid Musa Abu-Shalback, Plainfield, IL (US); Keith C Eden, Rockford, IL (US)

(72) Inventors: Shane Obitts, North Ridgeville, OH (US); Khalid Musa Abu-Shalback, Plainfield, IL (US); Keith C Eden, Rockford, IL (US)

(73) Assignee: Fasteners for Retail, Inc., Twinsburg, OH (US)

( * ) Notice: Subject to any disclaimer, the term of this patent is extended or adjusted under 35 U.S.C. 154(b) by 380 days.

(21) Appl. No.: 18/119,129

(22) Filed: Mar. 8, 2023

(65) Prior Publication Data

US 2023/0284798 A1 Sep. 14, 2023

Related U.S. Application Data

(60) Provisional application No. 63/319,661, filed on Mar. 14, 2022.

(51) Int. Cl.
*A47F 5/10* (2006.01)
*E05D 7/10* (2006.01)

(52) U.S. Cl.
CPC .............. *A47F 5/10* (2013.01); *E05D 7/1066* (2013.01); *E05Y 2900/20* (2013.01)

(58) Field of Classification Search
CPC ..... A47F 5/10; E05D 7/1066; E05Y 2900/20; E05Y 2900/212
See application file for complete search history.

(56) References Cited

U.S. PATENT DOCUMENTS 754,769 A * 3/1904 Higgins ................ E05D 7/1066 16/267
754,809 A * 3/1904 Rowland ............... E05D 7/1066 16/267
880,577 A * 3/1908 Rust ...................... E05D 7/1066 16/267

(Continued)

FOREIGN PATENT DOCUMENTS

DE 338541 C * 6/1921
DE 29704228 U1 * 6/1997
EP 0104268 A1 * 4/1984 ........... E05D 7/1066

*Primary Examiner* — Stanton L Krycinski
(74) *Attorney, Agent, or Firm* — Reinhart Boerner Van Deuren P.C.

(57) ABSTRACT

An access gate assembly for a retail merchandise display has a frame defining a product storage region. The access gate includes a mounting frame and a door. The mounting frame is configured to be attached to a frame of a retail merchandise display adjacent the product storage region. The mounting frame includes a door mounting member. The door includes a main panel having a front side and a rear side opposite the front side. The door includes a first door mount attached to the main panel. The first door mount has a first mounting hook having a mounting slot including an open mouth facing in a rearward direction sized to receive a portion of the door mounting member into the mounting slot and permitting the first door mount to rotate about the door mounting member.

32 Claims, 21 Drawing Sheets

(56) References Cited

U.S. PATENT DOCUMENTS

| | | | | | |
|---|---|---|---|---|---|
| 2,648,428 | A * | 8/1953 | White | B65D 7/42 | 206/386 |
| 3,060,492 | A * | 10/1962 | Dellith | E05D 7/1066 | 16/267 |
| 3,651,537 | A * | 3/1972 | Nichols | E05D 7/1066 | 16/267 |
| RE28,994 | E * | 10/1976 | Aylworth | E06B 3/5045 | 312/139.2 |
| 4,033,476 | A * | 7/1977 | Greenquist | B65D 90/54 | 16/267 |
| 4,070,074 | A * | 1/1978 | Rohme | E05D 3/022 | 49/257 |
| 4,195,890 | A * | 4/1980 | Kellogg | A47B 47/0083 | 312/265.2 |
| 4,357,736 | A * | 11/1982 | Karpisek | B65D 19/12 | 217/57 |
| 4,984,333 | A * | 1/1991 | Karpisek | E05D 7/1066 | 16/382 |
| 4,995,143 | A * | 2/1991 | Demura | A47B 81/06 | 16/362 |
| 5,231,732 | A * | 8/1993 | Knoop | B65D 90/008 | 16/254 |
| 5,530,993 | A * | 7/1996 | Hayakawa | E05D 11/1014 | 16/362 |
| 5,784,839 | A * | 7/1998 | LaVanway | E06B 3/38 | 52/204.64 |
| 5,997,112 | A * | 12/1999 | Karten | A47F 5/10 | 312/313 |
| 10,017,973 | B2 * | 7/2018 | Höschler | E05D 7/1061 | |
| 10,329,760 | B2 * | 6/2019 | Harber | E04B 2/827 | |
| 11,147,394 | B2 * | 10/2021 | Vogler | A47F 5/103 | |
| 2006/0163981 | A1 * | 7/2006 | Conrad | E06B 3/5045 | 312/323 |
| 2010/0117496 | A1 * | 5/2010 | Clarke | A47F 5/10 | 40/564 |
| 2020/0273303 | A1 * | 8/2020 | Ewing | A47F 3/002 | |

* cited by examiner

MERCHANDISE ACCESS GATE AND RETAIL MERCHANDISE DISPLAY INCLUDING MERCHANDISE ACCESS GATE

CROSS-REFERENCE TO RELATED PATENT APPLICATIONS

This patent application claims the benefit of U.S. Provisional Patent Application No. 63/319,661, filed Mar. 14, 2022, the entire teachings and disclosure of which are incorporated herein by reference thereto.

FIELD OF THE INVENTION

This invention generally relates to retail merchandise displays.

BACKGROUND OF THE INVENTION

Many devices are used to prevent or inhibit theft of retail merchandise from retail merchandise displays. For example, electronic tags can be added to product, product can be locked to peg hooks, product can be stored in display cases, etc.

The present disclosure provides improvements in devices for securing retail merchandise in a retail merchandise display that includes gondola shelving or racking shelve systems.

BRIEF SUMMARY OF THE INVENTION

In an example, an access gate assembly for a retail merchandise display having a frame defining a product storage region is provided. The access gate includes a mounting frame and a door. The mounting frame is configured to be attached to a frame of a retail merchandise display adjacent the product storage region. The mounting frame includes a door mounting member. The door includes a main panel having a front side and a rear side opposite the front side. The door includes a first door mount attached to the main panel. The first door mount has a first mounting hook having a mounting slot including an open mouth facing in a rearward direction sized to receive a portion of the door mounting member into the mounting slot and permitting the first door mount to rotate about the door mounting member.

In one example, the door includes a second door mount attached to the main panel. The second door mount has a first mounting hook having an open mouth facing in a rearward direction sized to receive a portion of the door mounting member therein and permitting the second door mount to rotate about the door mounting member.

In one example, a U-shaped spring clip attaches to the first mounting hook preventing the first mounting hook from being removed from the door mounting member.

In one example, the spring clip is attachable to the first mounting hook from the front side of the main panel.

In one example, the main panel has a top side. The first door mount extends outward from the top side of the main panel.

In one example, the main panel has an adjustable height. The height is perpendicular to an axis defined by the door mounting member about which the first mounting hook rotates.

In one example, the mounting slot includes a first portion extending along a first axis. The first portion includes the mouth. The mounting slot includes a second portion connected to the first portion. The second portion extends along a second axis that is non-parallel to the first axis such that at least part of the second portion is offset from the first portion. The second portion is offset forward of the mouth. The door mounting member is located within the second portion in an assembled state.

In one example, a clip attaches to the first mounting hook. The clip secures the first mounting hook to the door mounting member and prevents the door mounting member from being removed from the mounting slot.

In one example, the clip is U-shaped having spaced apart opposed and connected legs. Each leg has a connection tab extending inward. The connection tab engages an inner side of the first door mount to secure the clip to the first door mount.

In one example, the connection tab is proximate the distal ends of the legs, e.g. the end opposite where the two legs are connected to one another.

In one example, at least one of the connection tabs extends across and blocks at least a portion of the mouth of the mounting slot.

In one example, the first mounting hook is mounted to the door mounting member by moving the door mounting member within the first portion of the mounting slot relative to the first mounting hook along the first axis in a forward direction and then moving the door mounting member within the second portion of the mounting slot relative to the first mounting hook along the second axis away from the first axis and away from the main panel.

In one example, a locking clip attaches to the first mounting hook. The locking clip prevents the door mounting member from moving along the second axis within the second portion of the mounting slot to the first portion of the of the mounting slot.

In one example, the portion of the door mounting member received in the mounting slot has a round periphery.

In one example, the mounting frame includes a first frame rail member having a front panel. The door mounting member is mounted adjacent the first frame rail member and rearward of the front panel. The front panel defines a cutout region exposing the portion of the door mounting member to which the first mounting hook is attached. The first mounting hook is located within the cutout region when mounted to the door mounting member.

In one example, the first frame rail member includes a top panel that extends rearward from the front panel. The front panel and top panel form an L-shaped member. The top panel prevents insertion of the door mounting member into the mouth of the mounting slot unless the first mounting hook is oriented such that an insertion axis of the mouth of the mounting slot is non-parallel to the top panel and the mouth is directed towards the top panel.

In one example, the main panel hangs in a generally vertical orientation when mounted to the door mounting member. The top panel prevents the first mounting hook to be mounted to the door mounting member with the main panel in the generally vertical orientation.

In one example, the mounting frame includes a frame top rail, a frame bottom rail spaced apart from the frame top rail, a first frame side rail extending between the frame top and frame bottom rails and a second frame side rail extending between the frame top and frame bottom rails and being spaced apart from the first frame side rail. The length of the first and second frame side rails is adjustable to allow for adjustable spacing of the frame top and frame bottom rails.

In one example, the main panel has a first panel portion and a second panel portion. The first panel portion is movable relative to the second panel portion to adjust a height of the main panel.

In one example, the main panel includes a panel frame. The panel frame includes a panel top rail, a panel bottom rail spaced apart from the panel top rail, a first panel side rail extending between the panel top and panel bottom rails and a second panel side rail extending between the panel top and panel bottom rails and being spaced apart from the first panel side rail. The length of the first and second panel side rails is adjustable to allow for adjustable spacing of the panel top and panel bottom rails. The first panel portion is fixed relative to the panel top rail. The second panel portion is fixed relative to the panel bottom rail such that adjusting the spacing of the panel top and panel bottom rails adjusts the relative positions of the first and second panel portions.

In one example, a latch arrangement is provided that includes a latch having a cam surface carried by the door. The mounting frame has a strike region. The cam surface is tapered to drive the latch upward when contacting the strike and to permit passage of the latch when the door swings about the door mounting member in an inward direction. The latch abuts the strike when the door swings about the door mounting member in an outward direction and preventing further motion in the outward direction.

In one example, the latch is biased toward an extended position and is transitioned to a compressed position when the cam surface slides along and contacts the strike region. The latch is drivable against the biasing to move the latch to permit the latch to swing past the strike region in the outward direction.

In one example, the latch is electronically drivable by an electronic actuator to the compressed position.

In one example, the latch includes a manually manipulatable handle that can be driven by a user to manually transition the latch to the compressed position.

In one example, the strike region includes an aperture that receives the latch when the door is in a closed orientation.

In one example, when the latch extends into the aperture, the latch is inhibited from moving in an outward direction or an inward direction.

In one example, the mounting frame includes a front panel and a pair of side panels extending rearward relative to the front panel. The door is mounted to the front panel. The side panels have mounting members for releasably attaching the mounting frame to the frame of the retail merchandise display.

In one example, the mounting members are hooks for mounting to a vertically spaced array of apertures of uprights for a gondola shelving system.

In one example, the side panels are adjustable in length such that their length perpendicular to the front panel may be adjusted to cooperate with shelves of different depths.

In one example, the side panel is formed from a wire grid member and a plate member. The plate member axially slideable relative to the wire grid member to adjust a length of the side panel.

In one example, the plate member provides the hooks for mounting the apparatus to apertures in uprights of a gondola shelving system.

In one example, the side panels carry a latch arrangement. The latch arrangement has a latch member that is extendable into and retractable from the apertures in the gondola upright. The latch member is sized to prevent vertically moving the hooks relative to the gondola upright such that the hooks cannot be disengaged with the gondola upright.

In an example, a retail merchandise display is provided. The display includes a racking system. The racking system includes first and second spaced apart upright frames; first and second racking beams extending between and connected to the first and second upright frames in a vertically spaced orientation; and a product support deck positioned rearward of the second racking beam and vertically offset from the first racking beam. The product support deck defines a product storage region thereabove. The product storage region is rearward, at least in part, of the first and second racking beams. An access gate assembly as described above is mounted vertically between the first and second racking beams. The access gate assembly provides selective access to the product storage region.

In one example, the frame of the access gate assembly is directly fastened to at least one of the first and second racking beams.

In an example, a retail merchandise display is provided. The display includes a gondola shelving system. The gondola shelving system includes first and second spaced apart uprights. Each upright has a plurality of mounting apertures in a front face thereof. The gondola shelving system includes first and second shelves mounted to the first and second apart uprights in a cantilevered orientation. The first and second shelves are vertically spaced apart. The first shelf is below the second shelf and defines a product storage region thereabove. The display includes an access gate assembly as outlined above mounted to the first and second spaced apart uprights in a cantilevered orientation vertically between the first and second shelves. The access gate assembly provides selective access to the product storage region.

In one example, the access gate assembly is not directly fastened to the first and second shelves.

In one example, a portion of the weight of the access gate assembly is supported by the first shelf.

In one example, the top and bottom of the product storage region is defined by the first and second shelves and is not provided by a component mounted to the frame of the access gate assembly.

In one example that includes side panels, the side panels are adjustable in length.

In one example, the side panels include a latch arrangement that includes a latch member that has an end that is selectively insertable into apertures in the gondola uprights and prevents moving mounting features of the gate relative to the gondola uprights such that the mounting features can be removed from the apertures.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
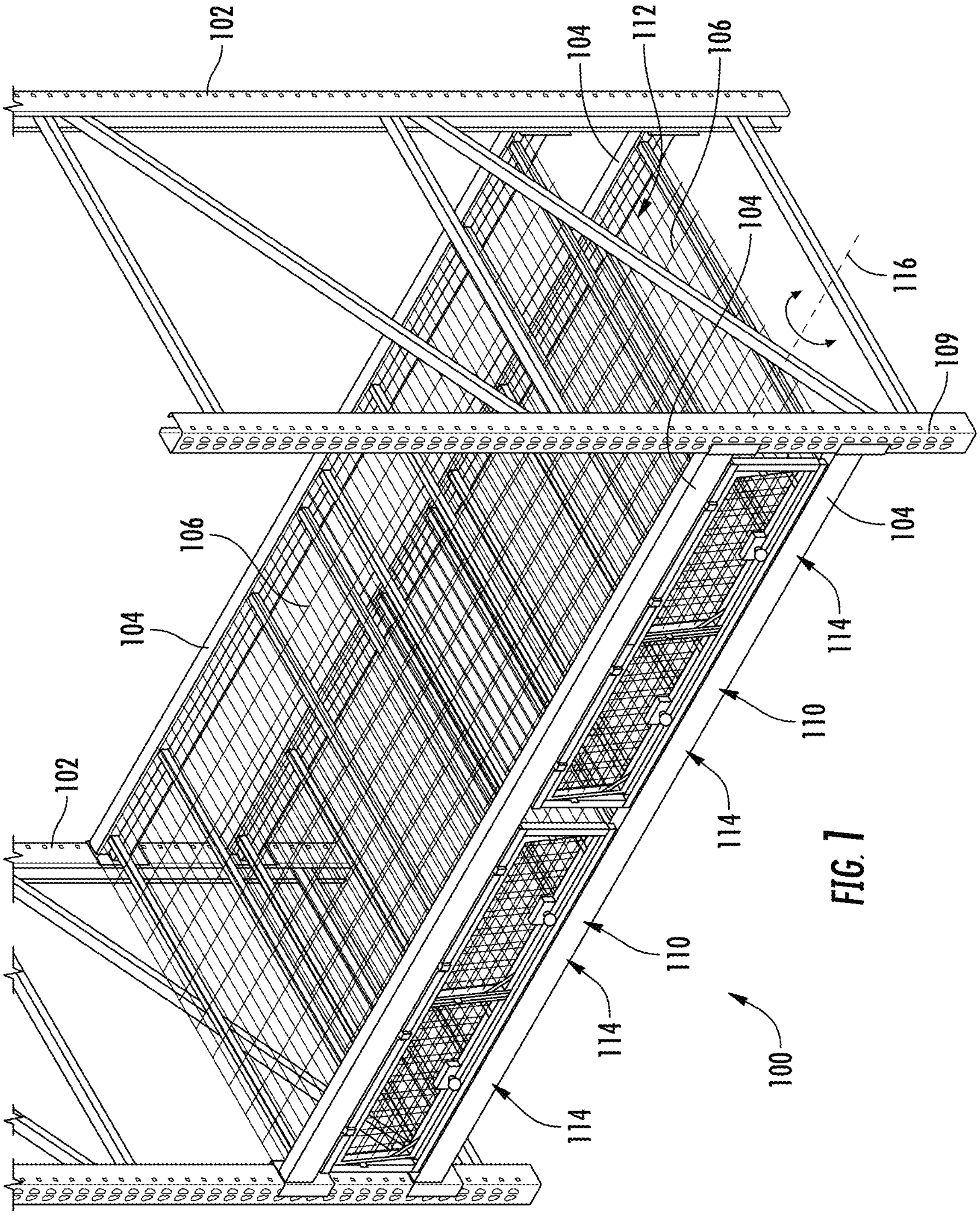
FIG. 1 is an example retail merchandise display that includes an access gate.

FIG. 1 illustrates a first example of retail merchandise display illustrated in the form of a racking system 100. The racking system 100 generally includes a pair of spaced apart upright frames 102, a plurality of racking beams 104 that extend between and are connected to the upright frames 102, a pair of product support decks 106, and a pair of access gate assemblies 110. The racking system 100 defines a product storage region 112 rearward of the access gate assemblies 110 and between the product support decks 106.

The racking beams 104 are operably secured to the upright frames 102 and generally define a frame of the racking system 100. The racking beams 104 can be mounted to the upright frames 102 at different vertical heights so as to adjust a spacing between the product support decks 106 so as to accommodate different height product within the product storage region 112.

In this example, the product support decks 106 are formed from wire grid that is supported by longitudinally extending rails that extend between the front and back of the product support decks and between racking beams 104.

In one example, the upright frames 102 include an array of mounting apertures 109 that receive corresponding connectors, e.g. hooks, of the racking beams 104 to releasably mount the racking beams 104 to the upright frames 102. In this example, the mounting apertures 109 are formed in front and rear faces of the upright frames 102, e.g. the front face faces a user and the rear face faces opposite the front face.

While a pair of access gate assemblies 110 are illustrated more ore fewer access gate assemblies 110 could be provided. Further, the access gate assemblies 110 are substantially identical so only a single access gate assembly 110 need be described.

The access gate assembly 110 provides selective access to the product storage region 112. In particular, the access gate assembly 110 includes one or more doors 114 that are operably rotatably mounted for rotation about axis 116 to allow for selective access to the product storage region 112. In this example, each access gate assembly 110 includes a pair of doors 114.

Figure 2:
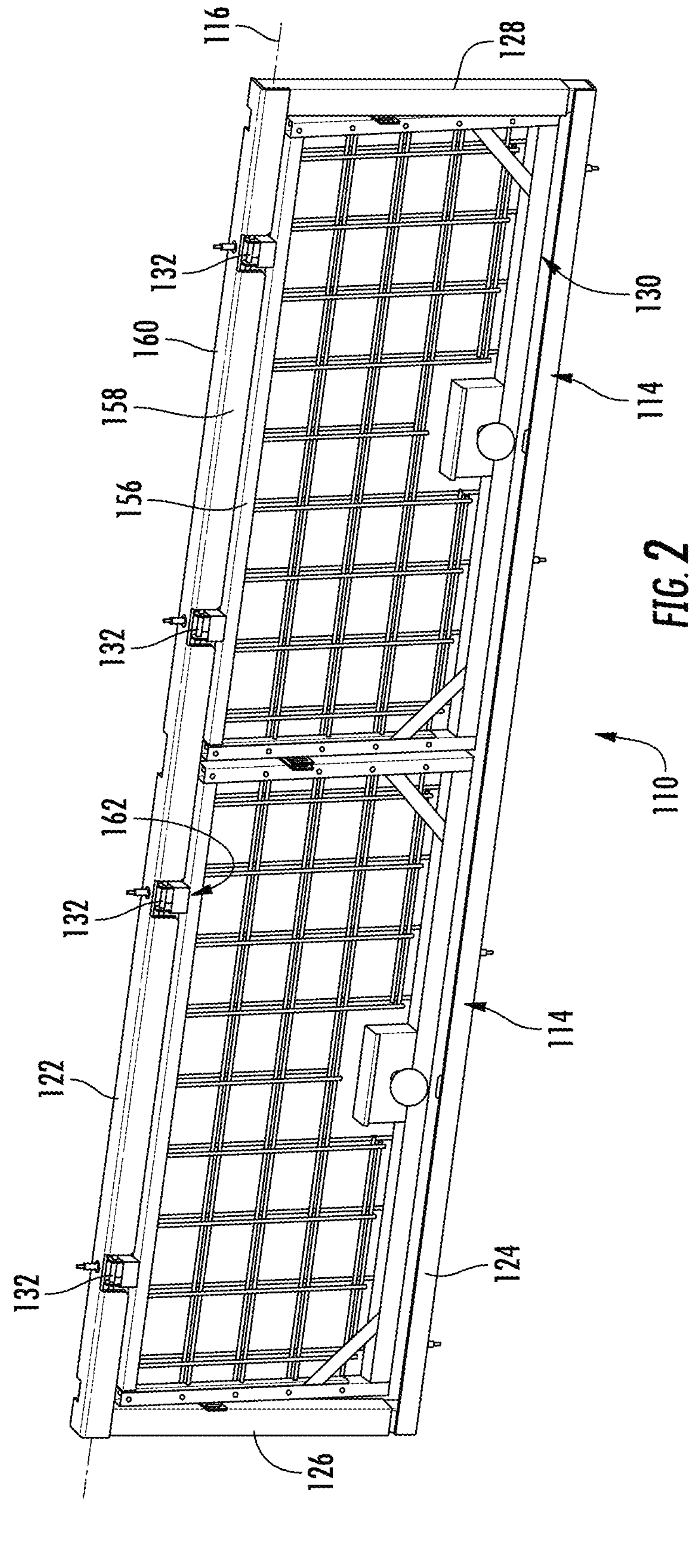
FIGS. 2 and 3 are illustrations of the access gate removed from the rest of the retail merchandise display.
Figure 3:
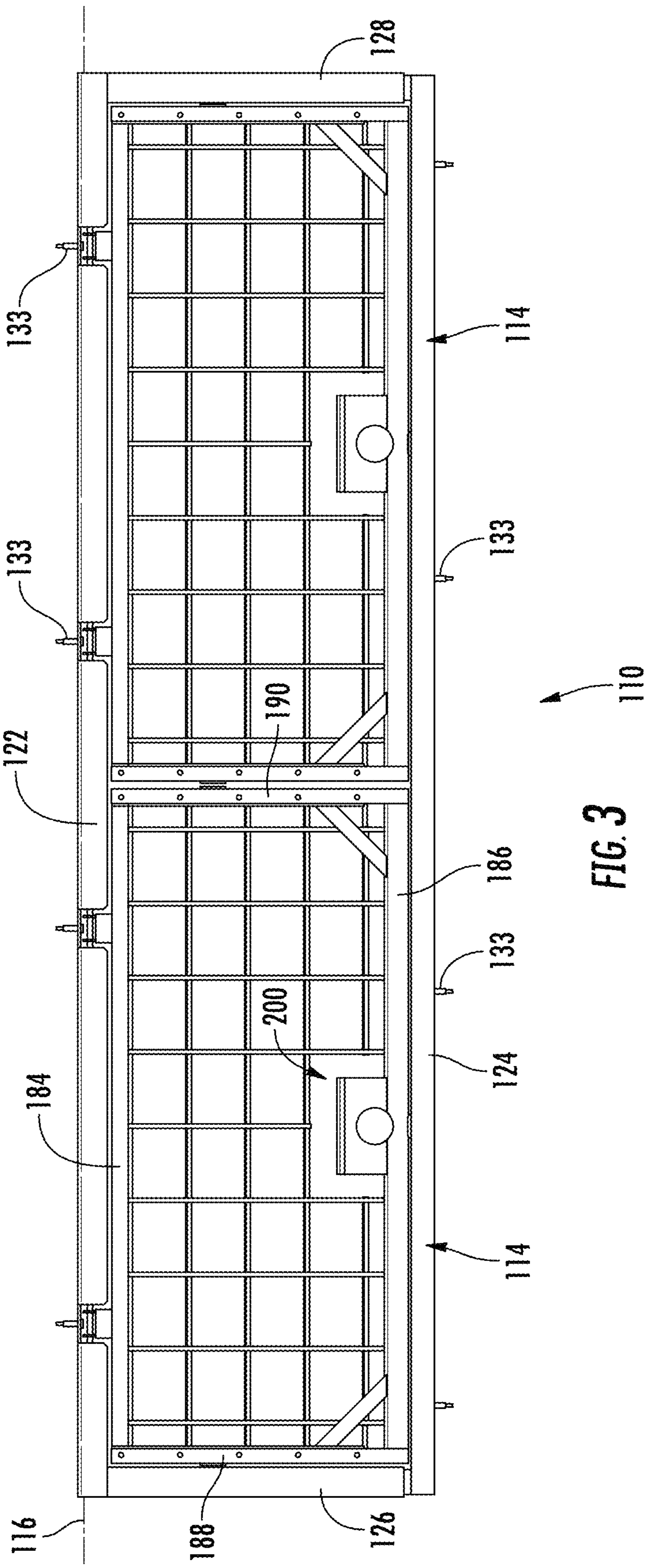
Figure 4:
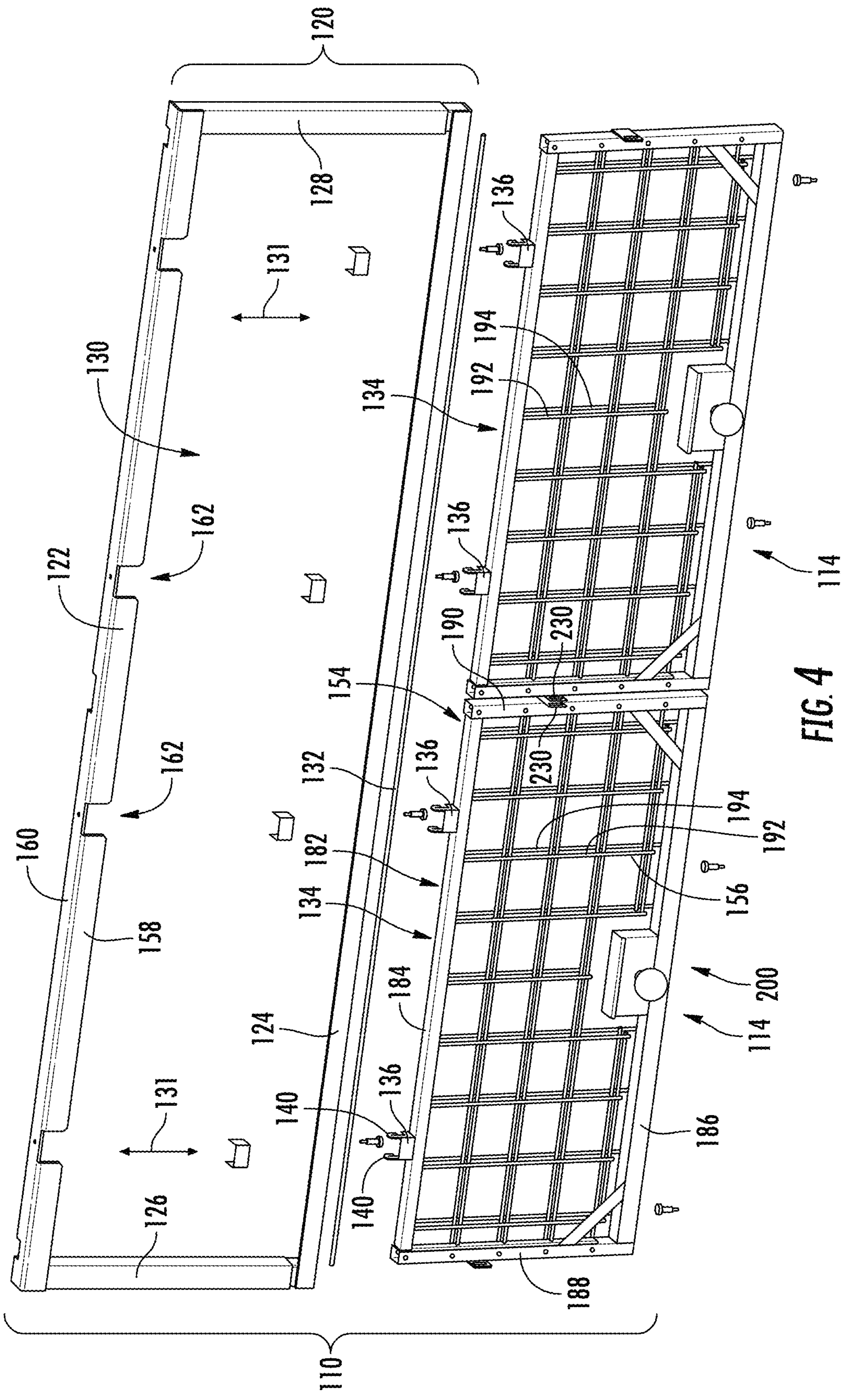
FIGS. 4 and 5 are partial exploded illustrations of the access gate.

FIGS. 2 and 3 illustrate the access gate assembly 110 removed from the frame of the racking system 100. FIG. 4 illustrates the access gate assembly 110 partially exploded.

In this example, the access gate assembly 110 includes a mounting frame 120 that is configured to be attached to the frame of the racking system 100 adjacent the product storage region 112. In this example, the mounting frame 120 includes a frame top rail 122, a frame bottom rail 124 spaced apart from the frame top rail 122, a first frame side rail 126 extending between the frame top and frame bottom rails 122, 124 and a second frame side rail 128 extending between the frame top and frame bottom rails 122, 124 and that is laterally spaced apart from the first frame side rail 126.

The frame rails 122, 124, 126, 128 generally defines an access opening 130 through which a user can access the product storage region 112.

Figure 5:
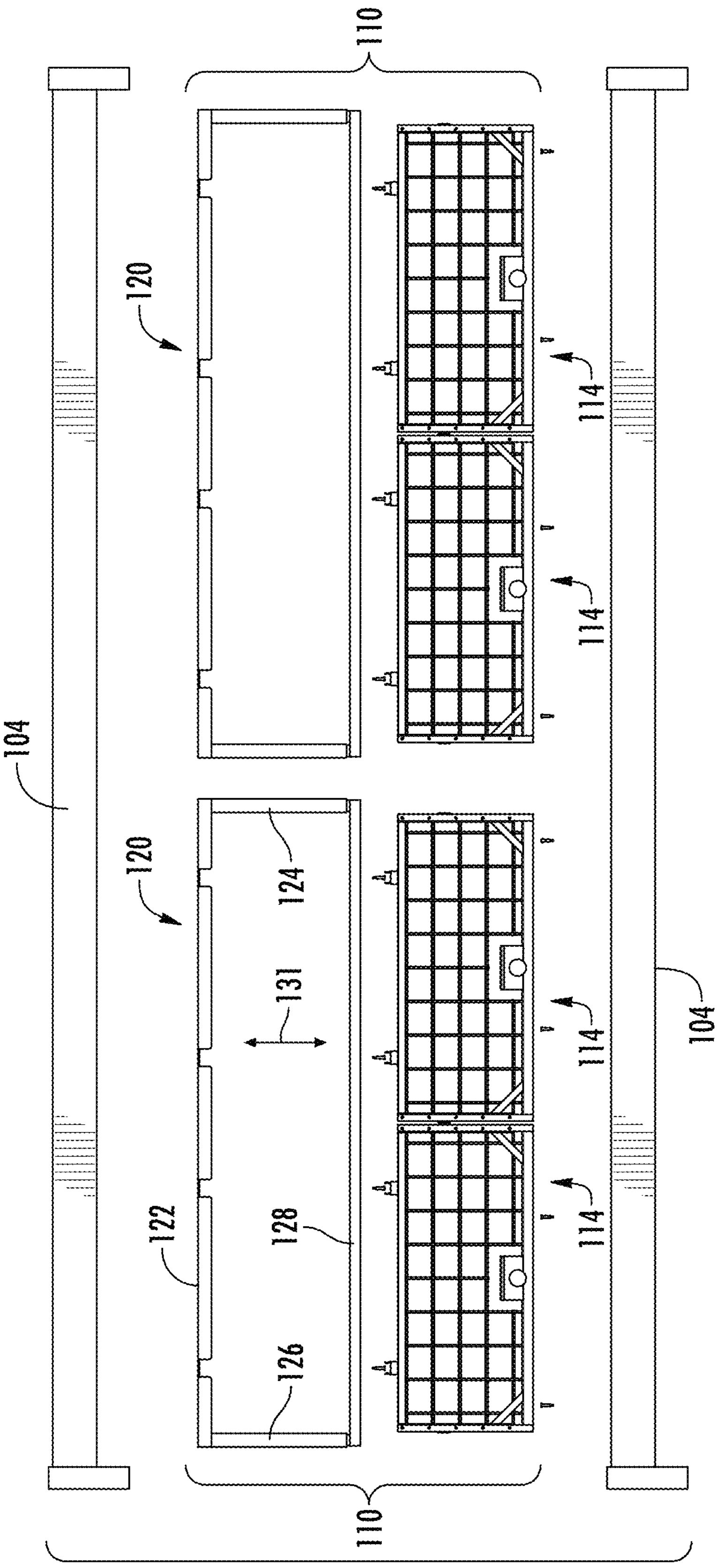
Figure 6:
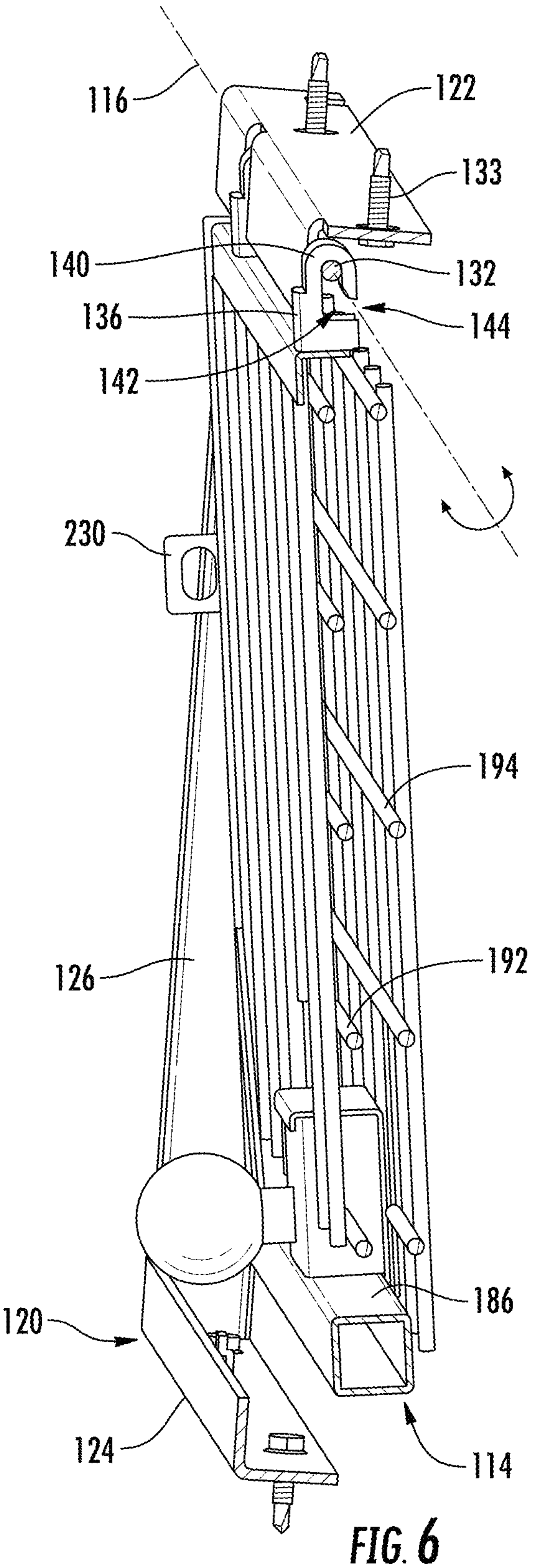
FIG. 6 is a partial cross-sectional illustration of the access gate.

In this example, the length of the first and second frame side rails 126, 128 is adjustable (as represented by arrow 131 in FIGS. 4 and 5) to allow for adjustable spacing of the frame top and frame bottom rails 122, 124. In this example, the frame side rails 126, 128 are formed from telescoping members that allow for the adjustable length. This allows the mounting frame 120 to be adjusted to the spacing between the racking beams 104 depending on the configuration of the racking system 100.

The mounting frame 120 includes a door mounting member 132 for mounting the doors 114. In this example, the door mounting member 132 is in the form of an elongated wire that extends between the first and second frame side rails 126, 128. The door mounting member 132 generally defines axis 116 and the door 114 operably mounts to the door mounting member 132 for rotational motion about axis 116 and door mounting member 132.

The mounting frame 120 can be mounted relative to the frame of the racking system 100 in numerous ways. In this example, screws 133 extend through the frame top and frame bottom rails 122, 124 and into the adjacent racking beams 104. Preferably, the screws 133 are self-tapping screws. In other embodiments, bolts, rivets, or other mechanical fasteners may be used to secure the mounting frame 120 to the frame of the racking system 100. In some embodiments, the mounting frame 120 could be attached to the upright frames 102.

Preferably, the fasteners, e.g. screws 133, extend through a sidewall of the adjacent top and bottom frame rails 122, 124 that are generally parallel to the adjacent surfaces of the racking beams 104.

The doors 114 are substantially identical such that the description of one door 114 is applicable to the remainder of the doors in the access gate assembly 110.

The door 114 includes a main panel 134 and at least one and typically multiple door mounts 136 attached to and extending outward from a top side of the main panel 134. In this example, the door mounts 136 include a pair of mounting hooks 140. The door mounts 136 and particularly the mounting hooks 140 operably attach the main panel 134 and the rest of the door to the door mounting member 132.

The mounting hooks 140 include a mounting slot 142 having an open mouth 144 that faces rearward. The mouth 144 of the mounting slot 142 is sized to receive a portion of the door mounting member 132 into the mounting slot 142.

In this example, the mounting slot 142 includes a first portion 146 that extends along a first slot axis 148. The first portion 146 includes mouth 144. The mounting slot 142 includes a second portion 150 that is connected to the first portion 146. The second portion extends along a second slot axis 152 that is non-parallel to the first slot axis 148. As such, at least a portion, of the second portion 150 is offset from the first portion 146.

The second portion 150 is offset forward of mouth 144. In some examples, the first and second slot axes 148, 152 are generally perpendicular to one another (e.g. plus or minus 10 degrees from 90 degrees). However, other angles are contemplated.

In this example, due to the orientation of the first and second portions 146, 150 of the mounting slot 142, the mounting slot 142 is generally L-shaped.

Figure 7:
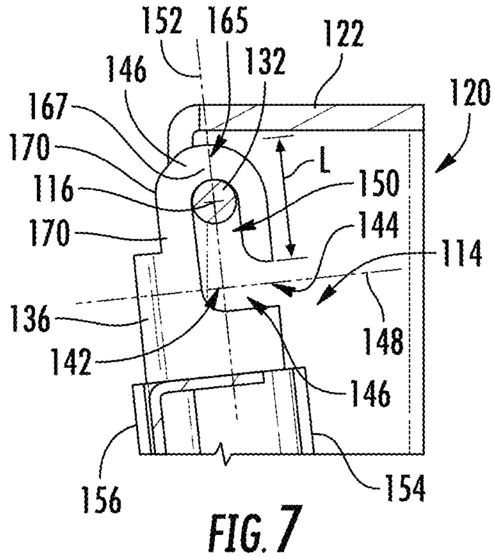
FIG. 7 is an enlarged illustration of the mounting arrangement with the door in the fully mounted position.

With reference to FIG. 7, when assembled, the second portion 150 is offset upward above the first portion 146. Further, the door mounting member 132 is located within the second portion 150 in the assembled state.

Figure 8:
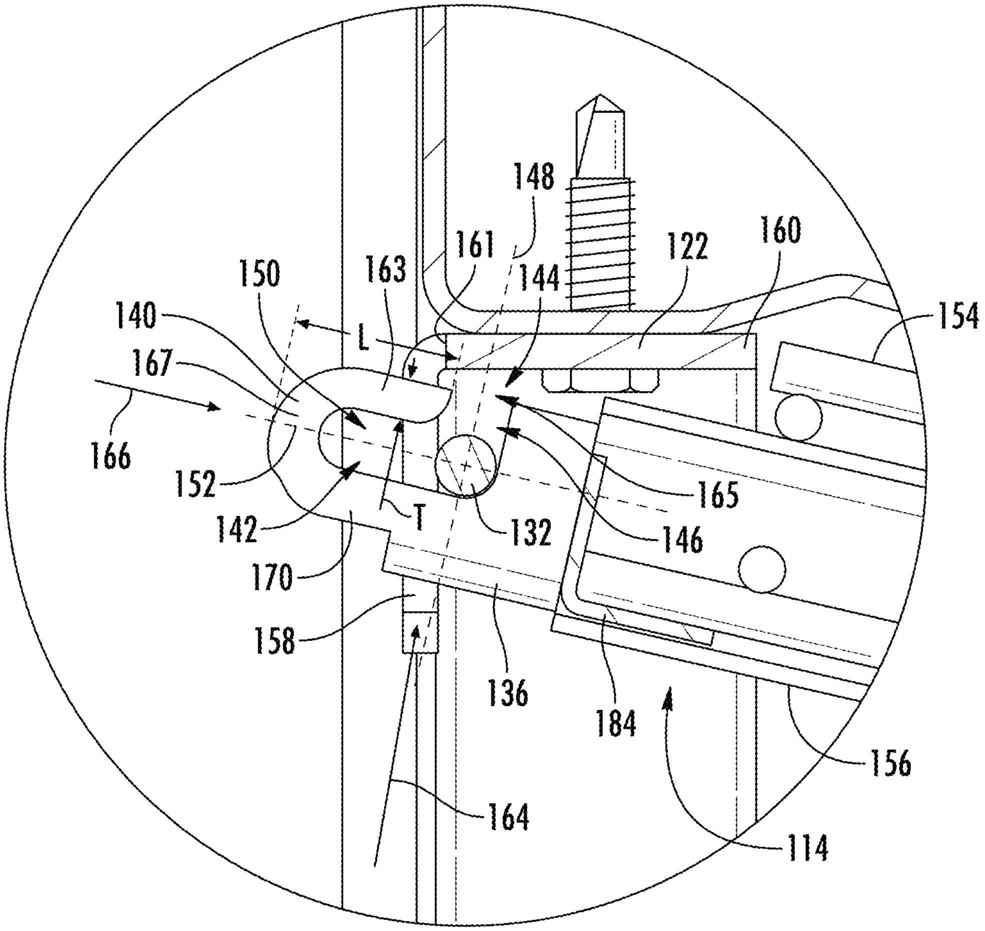
FIG. 8 is an enlarged illustration of the mounting arrangement for mounting the door of the access gate.
Figure 9:
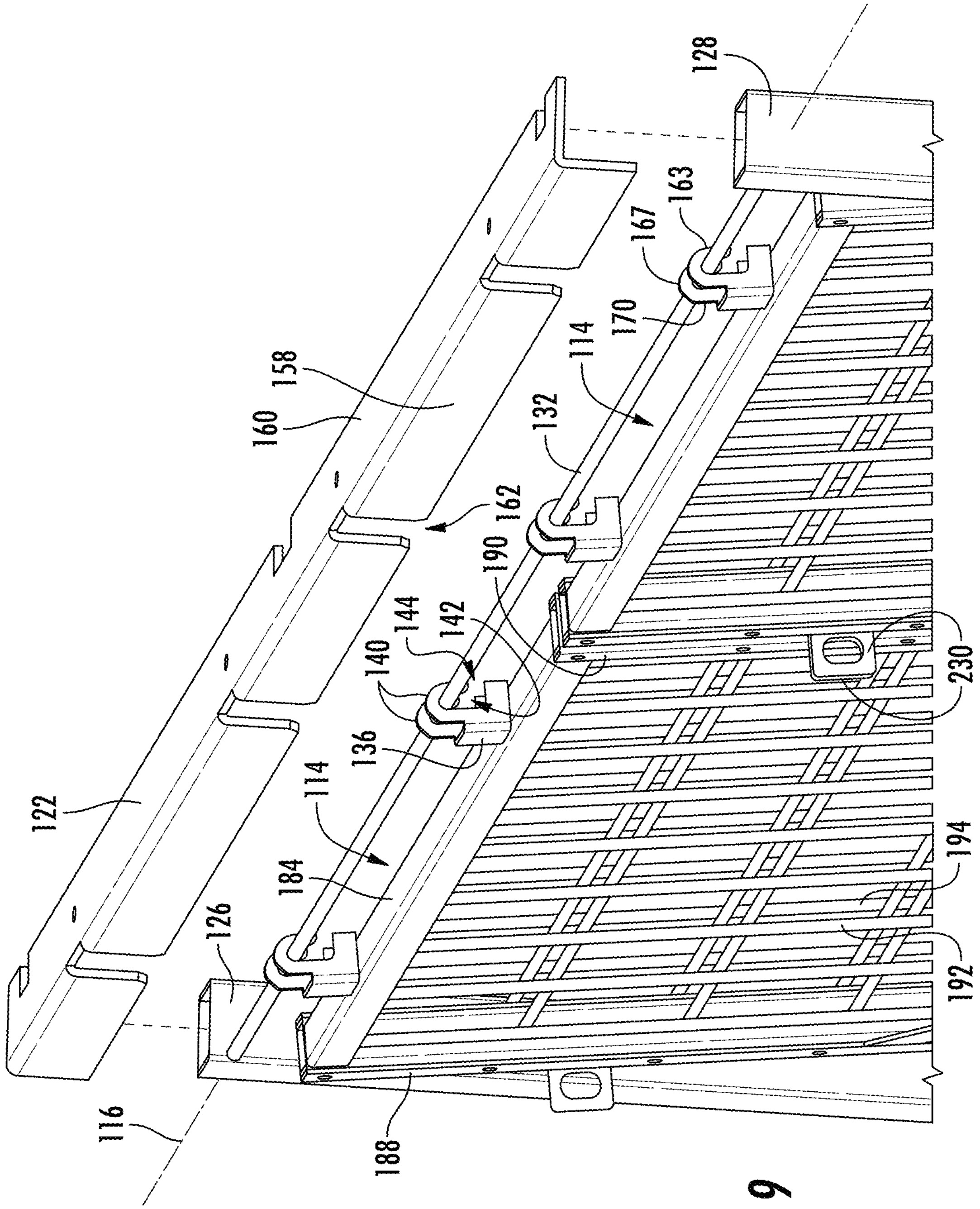
FIG. 9 is a partial exploded illustration of a portion of the access gate illustrating the mounting arrangement for mounting the door of the access gate.
Figure 10:
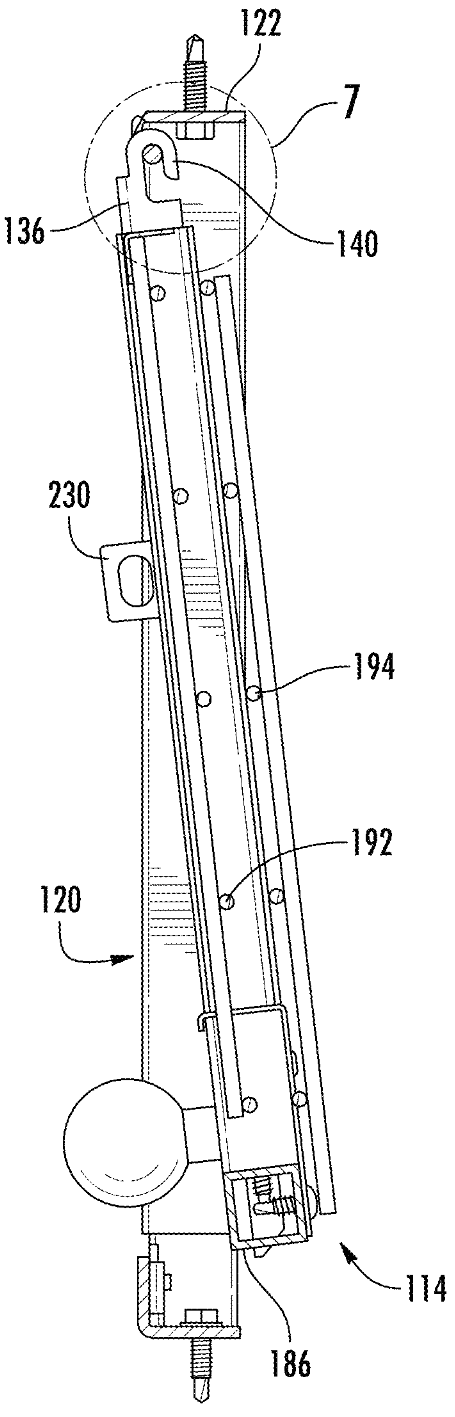
FIGS. 10 and 11 are partial cross-sectional illustrations of the access gate.
Figure 11:
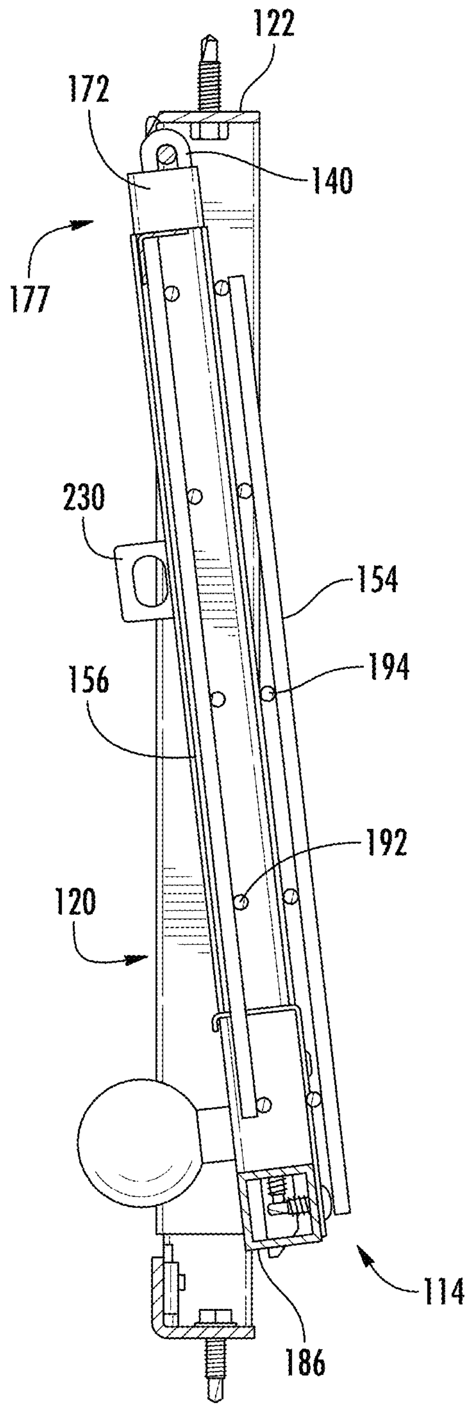
Figure 12:
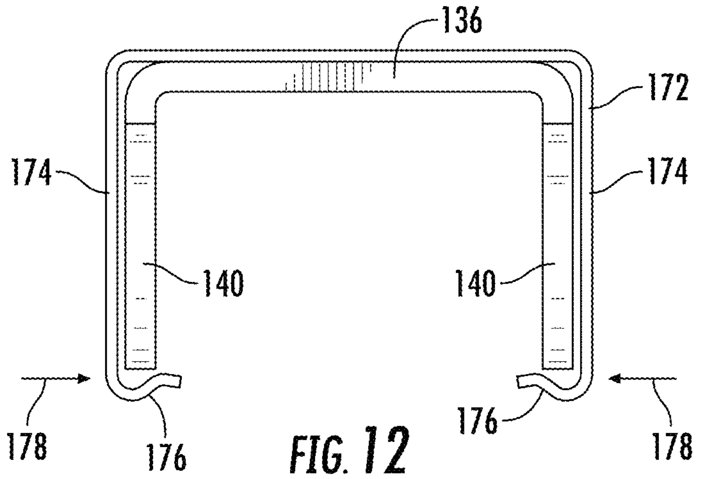
FIG. 12 is a top view of the mounting structure for mounting the door to the frame of the access gate.

With reference to FIG. 8, to mount the door 114 to the door mounting member 132, the door mounting member is passed through the mouth 144 from a rear side 154 of the main panel 134, along the first slot axis 148 towards a front side 156 of the main panel 134 until it reaches the second portion 150 of the mounting slot 142. Thereafter, the door mounting member 132 is moved along the second slot axis 152 toward a closed end of the mounting slot 142.

With reference to FIGS. 2 and 4, the top frame rail 122 includes a front panel 158 and a top panel 160 that extends rearward from the front panel 158 such that the top frame rail 122 is an L-shaped member.

The door mounting member 132 is below the top panel 160 and rearward of the front panel 158. The front panel 158 includes a plurality of cutout regions 162. Each cut out region 162 exposes a portion of the door mounting member 132 to which corresponding mounting hooks 140 are attached. When assembled, the door mounts 136 are axially aligned with the cutout regions 162 along the door mounting member 132 such that the mounting hooks 140 are located within the cutout regions 162.

Due to the configuration of the mounting hooks 140 and the location of the door mounting member 132 relative to the top panel 160, the mounting hooks 140 and the main panel 134 must be rotated to insert the door mounting member 132 into mouth 144 and into the door mounting slot 142. This rotated orientation of the door 114 relative to frame 120 and particularly top frame rail 122 is illustrated in FIG. 8. In this example, the door 114 must be rotated in a rearward orientation.

More particularly, the door mounting member 132 is positioned rearward of the front edge 161 of the top panel 160. Further, the gap 165 between the door mounting member 132 and the top panel 160 and the length L of rear leg portion 163 is such that the rear leg portion 163 of the mounting hook 140 cannot pass through the space between the door mounting member 132 and the top panel 160 without it being rotated. However, the thickness T of the rear leg portion 163 is sized to fit through the gap 165. Further, the thickness T1 of the bend region 167 of the mounting hook 140 is similarly sized to extend through gap 165 such that the door 114 may freely hang from the door mounting member 132 when the door mounting member 132 is located at the end of the second portion 150 of mounting slot 142 (see e.g. FIG. 7).

The top panel 160 prevents the mounting hooks 140 from being mounted to the door mounting member 132 with the main panel 134 and door 114 when oriented in a generally vertical orientation.

In this example, mouth 144 is aimed at the top panel 160 as the door mounting member 132 is moved along first slot axis 148. Once the door mounting member 132 reaches the second portion 150 and the second slot axis 152 and the end of the first portion 146 of the mounting slot, the door mounting member 132 can be moved axially along the second slot axis 152 relative to the mounting hook 140. Once the door mounting member 132 has been sufficiently inserted into the second portion 150, the door 114 can be rotated forward towards a more vertical orientation.

Arrows 164, 166 illustrate the motion of the mounting hook 140 relative to the door mounting member 132 during assembly. Arrow 164 illustrates insertion of the door mounting member 132 through mouth 144 and arrow 166 illustrates motion of the door 114 to seat the door mounting member 132 within the second portion 150 and toward the closed end of the second portion 150.

In some examples, the first slot axis 148 extends at an angle of no less than 60 degrees relative to top panel 160 when the door mounting member 132 is inserted into mouth 144 and preferably no less than 75 degrees.

In some examples, the mounting hooks 140, and particularly a front leg 170 thereof extend forward of front panel 158, when assembled.

A locking clip 172 attaches to the door mount 136 and secures the mounting hook 140 to the door mounting member 132 preventing the door mount from being removed from the door mounting member 132. The locking clip 172 is generally U-shaped and includes spaced apart legs 174. Each leg includes an inward directed connection tab 176. The tabs 176 extend inward toward one another. In this example, the connection tabs 176 are inward bent ends of the legs 174.

Figure 13:
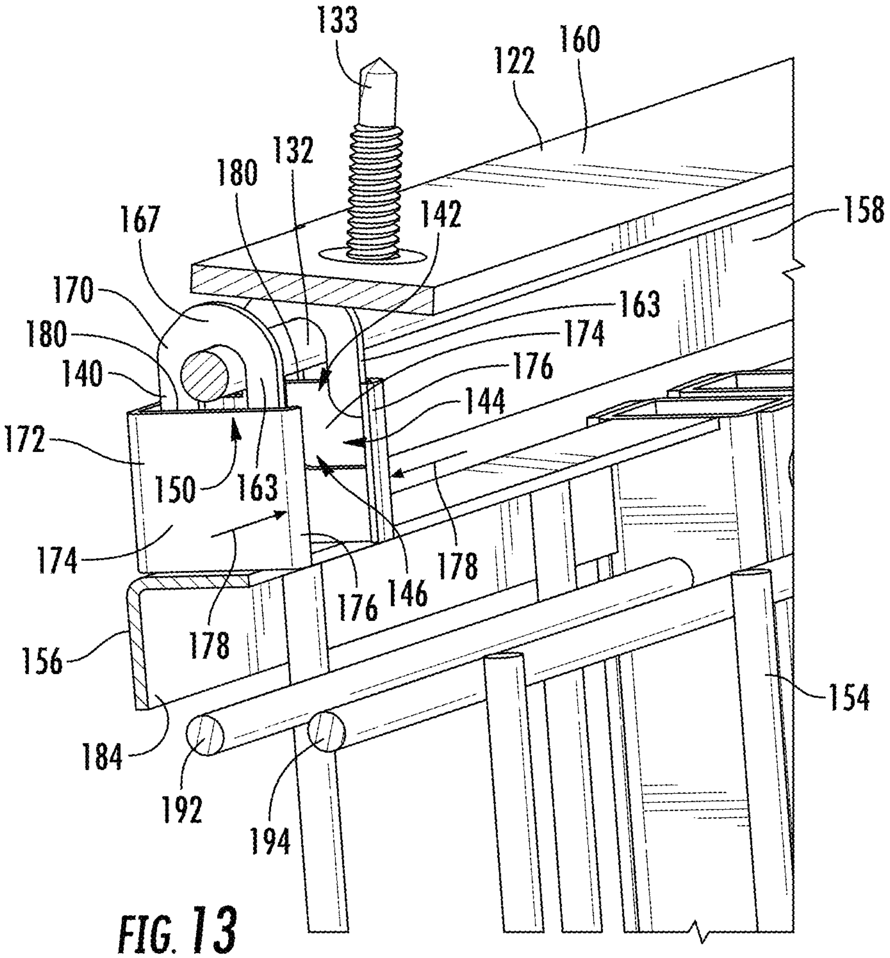
FIG. 13 is a perspective illustration of the mounting arrangement illustrating the locking clips with the door fully mounted.
Figure 14:
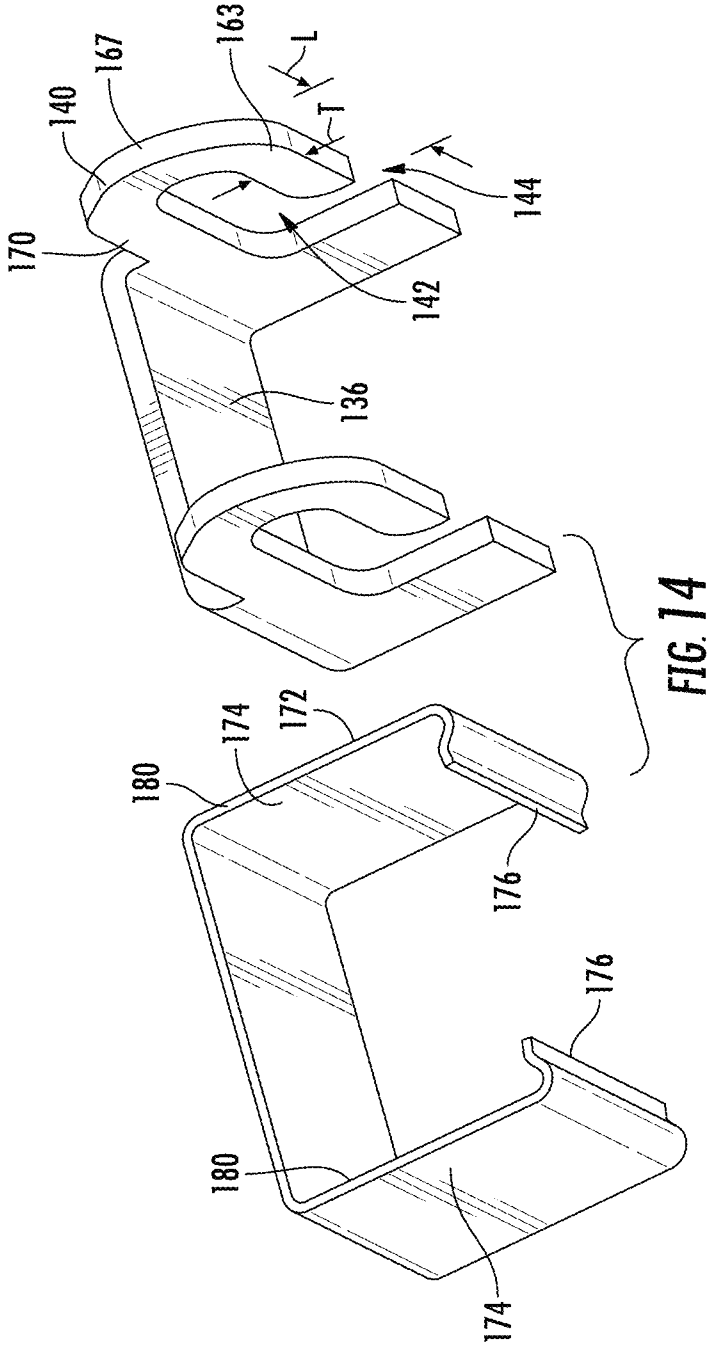
FIG. 14 is an exploded illustration of the mounting hooks and locking clip for securing a door to a mounting member of the frame of the access gate.

The legs 174 are sufficiently flexible and resilient such that they can be bent laterally outward to allow the connection tabs 176 to clear the mounting hooks 140. In the illustrated embodiment, the locking clip 176 can be attached from the front side 156 of the door 114 and inserted in a rearward motion illustrated by arrow 177. Once the locking clip 172 is installed sufficiently far and the connection tabs 176 clear the rear legs 163, the legs 174 resiliently spring back inward (see arrows 178 in FIG. 13) and the connection tabs 176 secure the clip 172 to the mounting hooks 140.

The locking clip 172 extends across and blocks the mouth 144. Further, a top edge 180 of the legs 174 secures the door mounting member 132 in the second portion 150 of the mounting slot 142.

In the illustrated example, the main panel 134 includes a panel frame 182. The panel frame 182 includes a panel top rail 184, a panel bottom rail 186 spaced apart from the panel top rail 184, a first panel side rail 188 extending between the panel top and panel bottom rails 184, 186 and a second panel side rail 190 extending between the panel top and panel bottom rails 184, 186 and being spaced apart from the first panel side rail 188.

The length of the first and second panel side rails 188, 190 is adjustable to allow for adjustable spacing of the panel top and panel bottom rails 184, 186. This allows the height of the main panel 134 to be adjustable to correspond to the spacing between the beams 104 and the height of the mounting frame 120. The panel side rails 188, 190 may have telescoping members that allow for the length adjustments.

Due to the vertical height adjustability, the main panel 134 includes first and second panel portions 192, 194. The first panel portion 192 is moveable relative to the second panel portion 194 parallel to a vertical axis.

The first panel portion 192 is fixed relative to the panel top rail 184, a first member of the first panel side rail 188, and a first member of the second panel side rail 190. The second panel portion 194 is fixed relative to the panel bottom rail 186, a second member of the first panel side rail 188, and a second member of the second panel side rail 190. As such, adjusting the spacing between the panel top rail 184 and panel bottom rail 186 adjusts the position of the first panel portion 192 relative to the second panel portion 194.

In this example, the first and second panel portions 192, 194 are formed from wire grid work.

Figure 16:
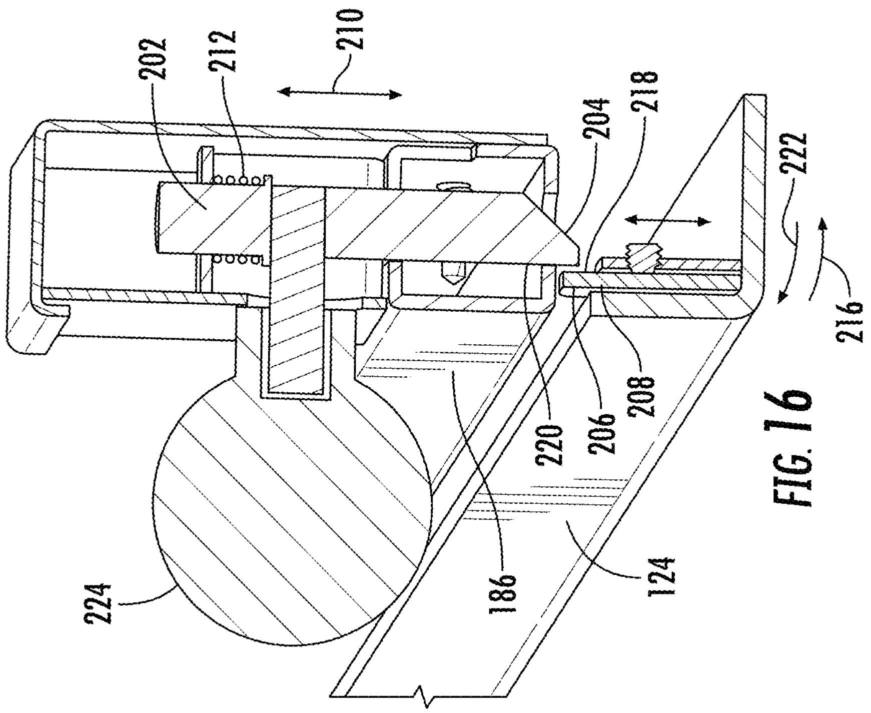
FIGS. 15 and 16 are partial cross-sectional illustrations of a latching arrangement for securing the door of the access gate in a closed orientation.
Figure 15:
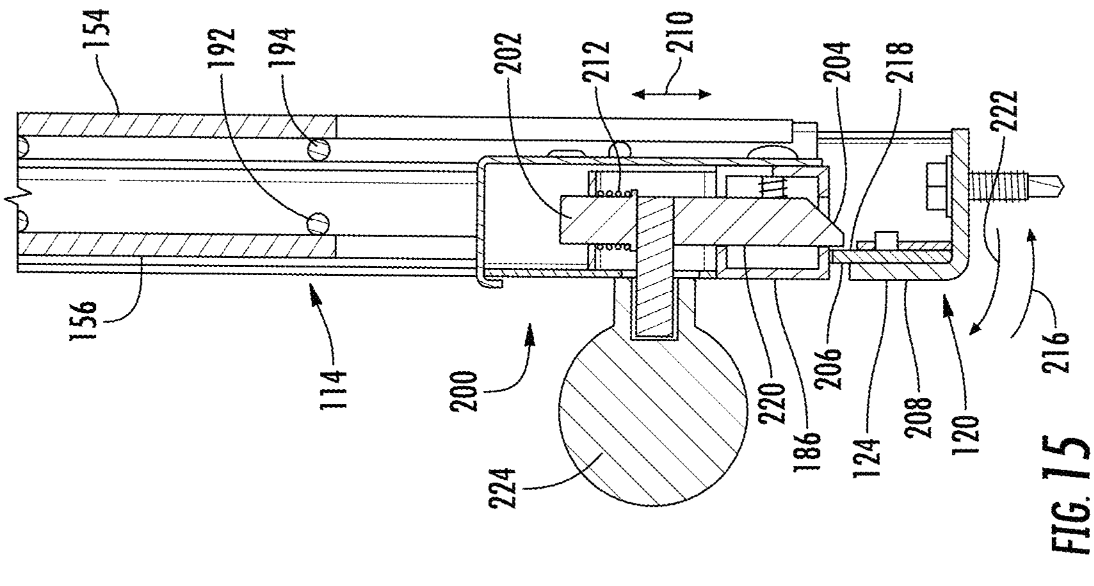

With reference to FIGS. 15 and 16, a latch arrangement 200 acts between the door 114 and the mounting frame 120. The latch arrangement 200 can prevent opening the door 114, e.g. pivoting it in the forward direction such that the bottom panel rail 186 moves forward of the bottom frame rail 124.

The latch arrangement 200 includes a latch 202 having a cam surface 204. The latch 202 is carried by the door 114. The latch arrangement 200 includes a strike region 206 provided by the mounting frame 120. The strike region 206 can be provided by an abutment provided by the frame bottom rail 124 or a strike member 208 attached to the frame bottom rail 124. The illustrated embodiment, the strike region 206 is provided by a strike member 208 attached to the frame bottom rail 124. The strike member 208 is vertically adjustable relative to the frame bottom rail 124 to adjust its registration with the latch 202 carried by the door 114.

The latch 202 is axially slidable parallel to arrow 210 between a compressed or retracted position and an extended position. The latch 202 is illustrated in the extended position in FIGS. 15 and 16. The latch 202 is biased by a biasing member 212 toward the extended position.

When the door 114 is rotated in a rearward direction from an open position, e.g. with the panel bottom rail 186 forward of the frame bottom rail 124, as illustrated by arrow 216, the cam surface 204 will contact the forward surface of the strike region 206 driving the latch 202 toward the compressed position (e.g. upward). This will allow the latch 202 to clear the strike region 206 until it passes a rear facing abutment 218 of the strike region 206.

The biasing member 212 will then again return the latch 202 to the extend position from the compressed position. In this orientation, the latch 202 prevents the door 114 from rotating back to the open position with the panel rail 186 forward of the frame bottom rail 124. More particularly, a forward facing surface 220 of the latch will abut rear facing abutment 218 inhibiting motion illustrated by arrow 222.

To move the door 114 to the open position, the latch 202 must be actively driven to the compressed position, e.g. upward. In the illustrated example, handle 224 is connected to latch 202 and a user can manipulate handle 224 to drive the latch 202.

In other embodiments, the latch 202 may be electrically driven such as by a linear motor or an armature. Such electric actuation could occur by pressing a button. Alternatively, an electronic controller could be connected to an electric actuator for actuating the latch 202. A control signal could be provided by a security tag provided by a user.

As noted previously, the access gate assemblies 110 of the illustrated examples include a pair of doors 114 attached to a single mounting frame 120. In this example and as illustrated in FIGS. 6 and 9-11, doors 114 each have a padlock staple 230 attached to adjacent sides of the adjacent pair of doors 114. A padlock or other locking mechanism (e.g. a bolt) can secure the two adjacent doors to one another.

When the two adjacent doors 114 are secured to one another, it requires the user to manipulate the latch arrangement 200 of both doors 114 to transition either door 114 to the open orientation. Thus, a user must use both hands and thus would be restricted or inhibited in any attempts at stealing merchandise.

This requires an operator to use both hands to unlatch the pair of doors 114. This provides significant deterrents to theft as it is difficult to both open the doors 114 and then to swipe or remove large quantities of product.

Figure 17:
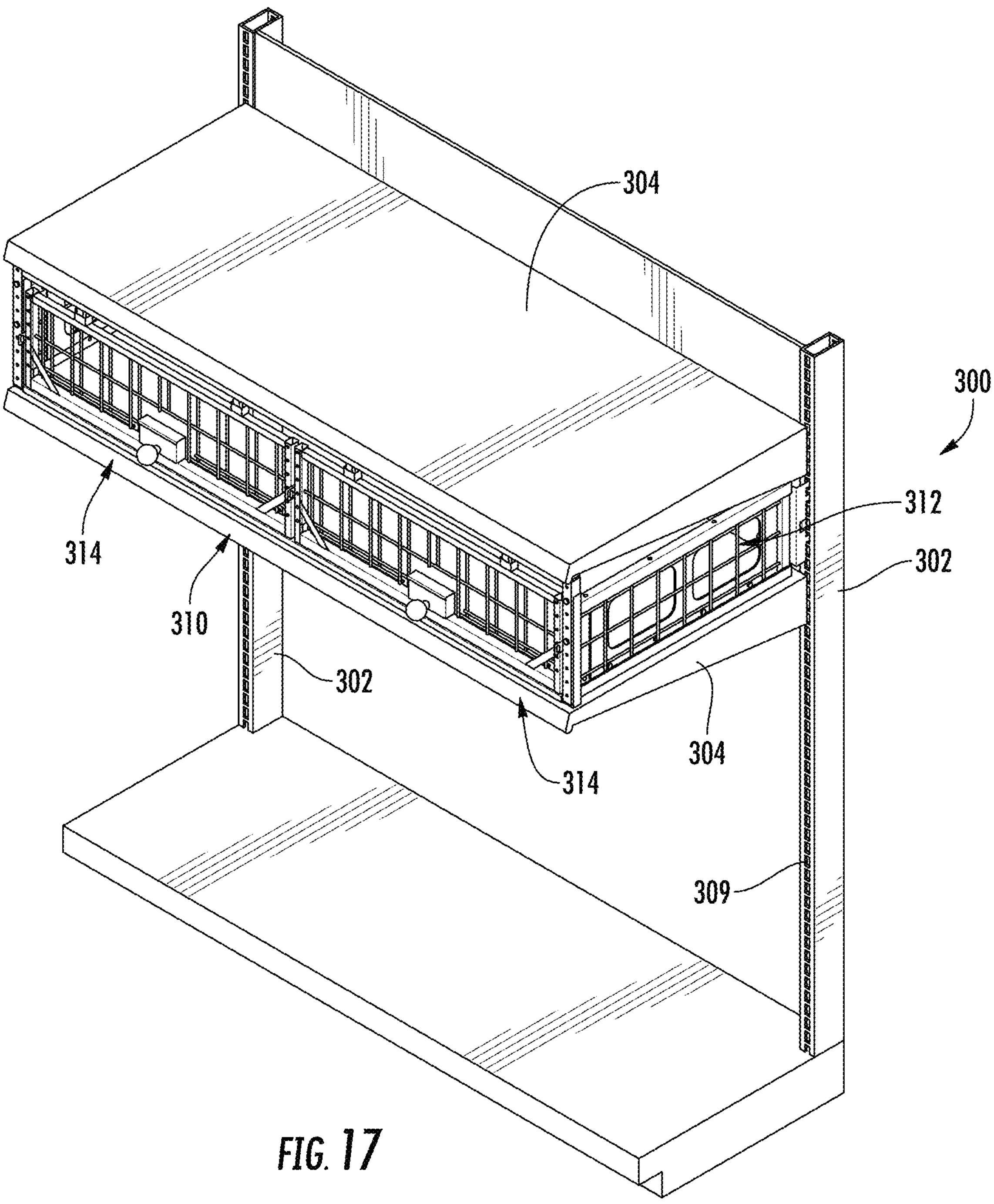
FIG. 17 is another example retail merchandise display that includes an access gate.
Figure 18:
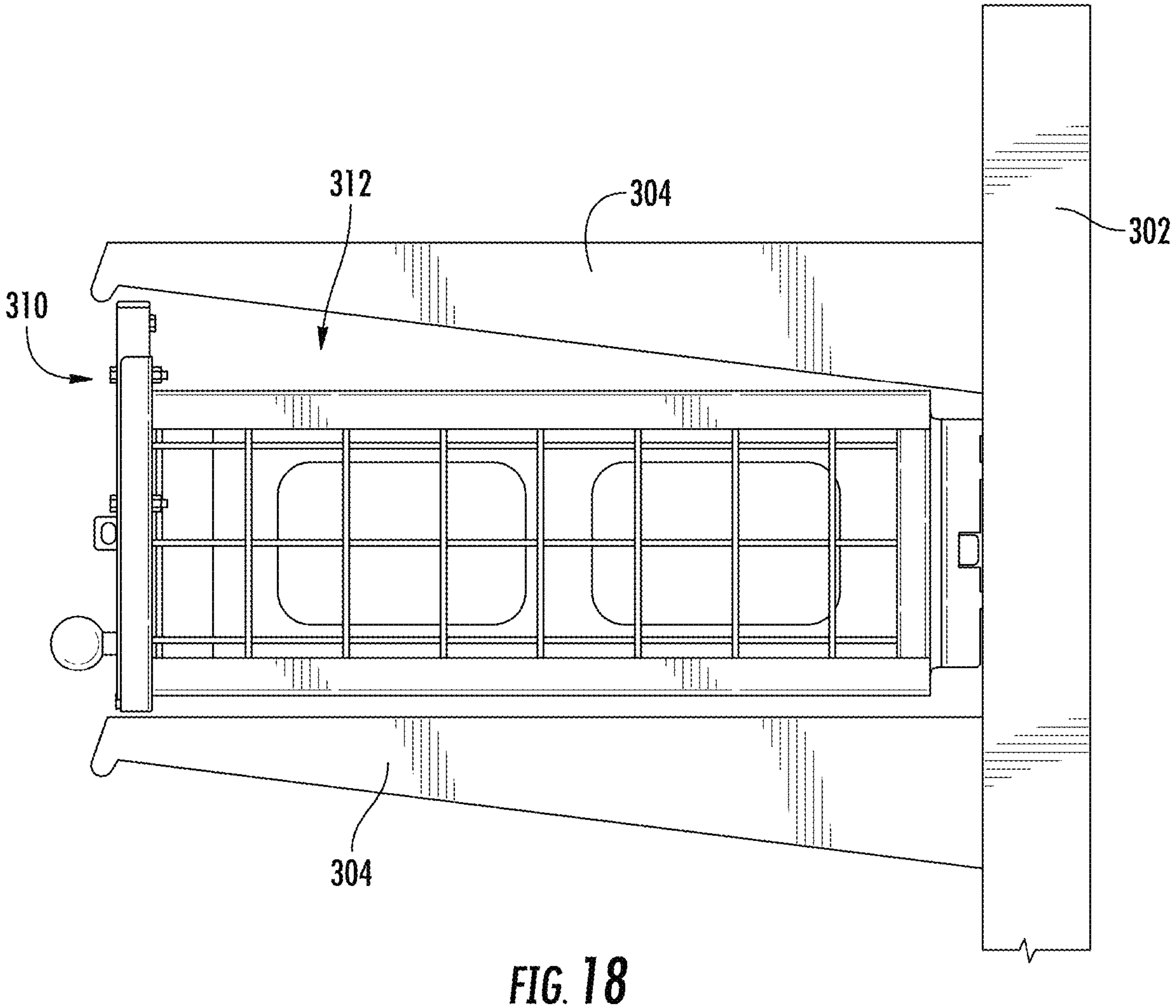
FIG. 18 is a side view of the retail merchandise display of FIG. 17.

FIGS. 17 and 18 illustrate another example of a retail merchandise display 300 in the form of a shelving system 300. In the illustrated example, the shelving system 300 takes the form of a gondola shelving system. The shelving system 300 generally includes a pair of spaced apart upright 302, a plurality of shelves 304 that are mounted to the uprights 302 and an gate assembly 310 located between an adjacent pair of vertically spaced apart shelves 304. The shelving system 300 defines a product storage region 312 rearward of the access gate assembly 310 and between the shelves 304.

The uprights 302 and shelves 304 form part of a frame of the retail merchandise display 300.

The shelves 304 are removably mountable to the uprights 302 such that the vertical positioning can be changed so that the vertical spacing between adjacent shelves 304 is permissible. The shelves 304 are mounted in a cantilevered orientation relative to the vertical uprights 302. The front face of the vertical uprights 302 include an array of vertically spaced mounting apertures 309 that receiving mounting hooks of the shelves 304 for mounting the shelves 304 to the uprights 302.

Figure 19:
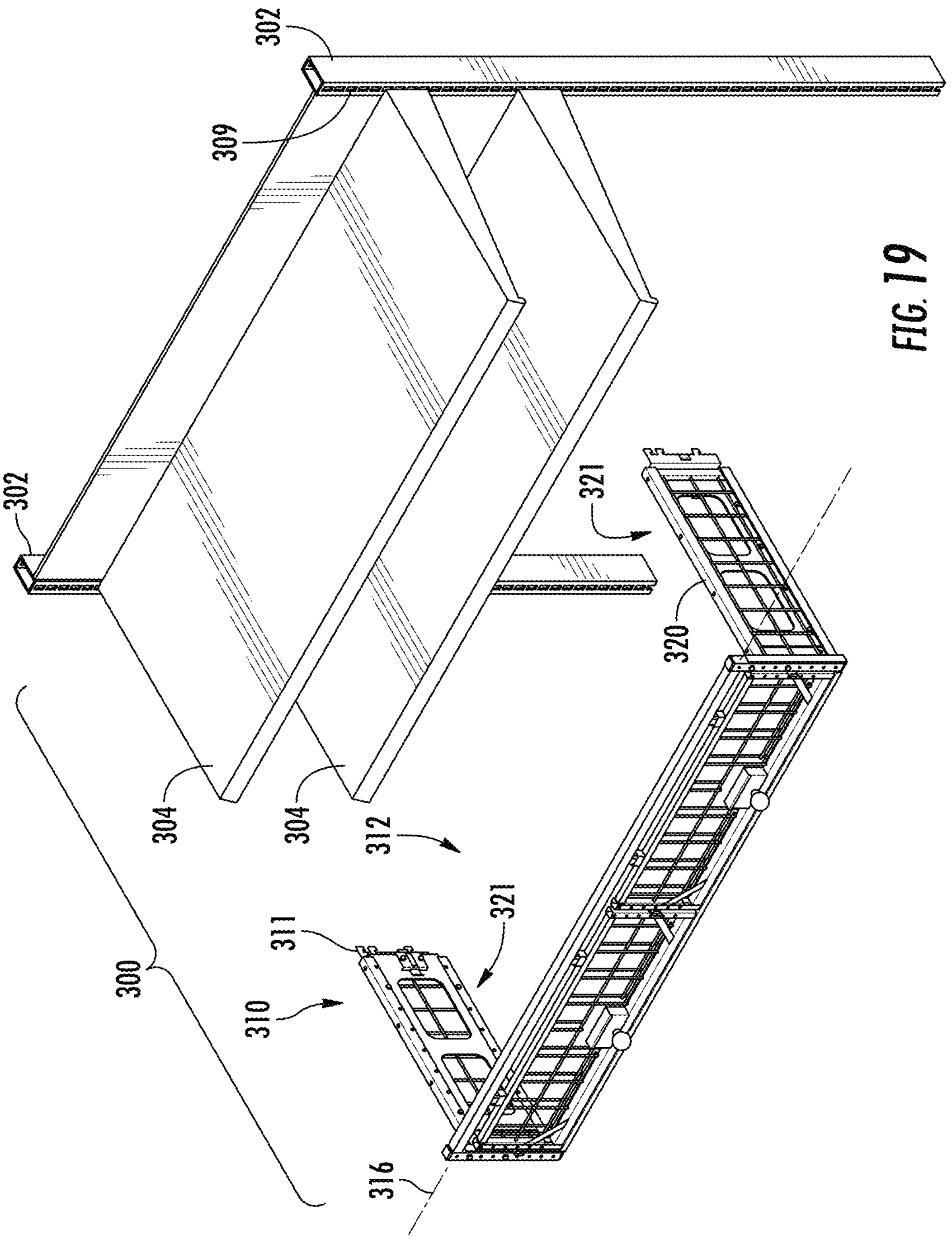
FIG. 19 is an exploded illustration of the retail merchandise display of FIG. 17 with the access gate removed.
Figure 20:
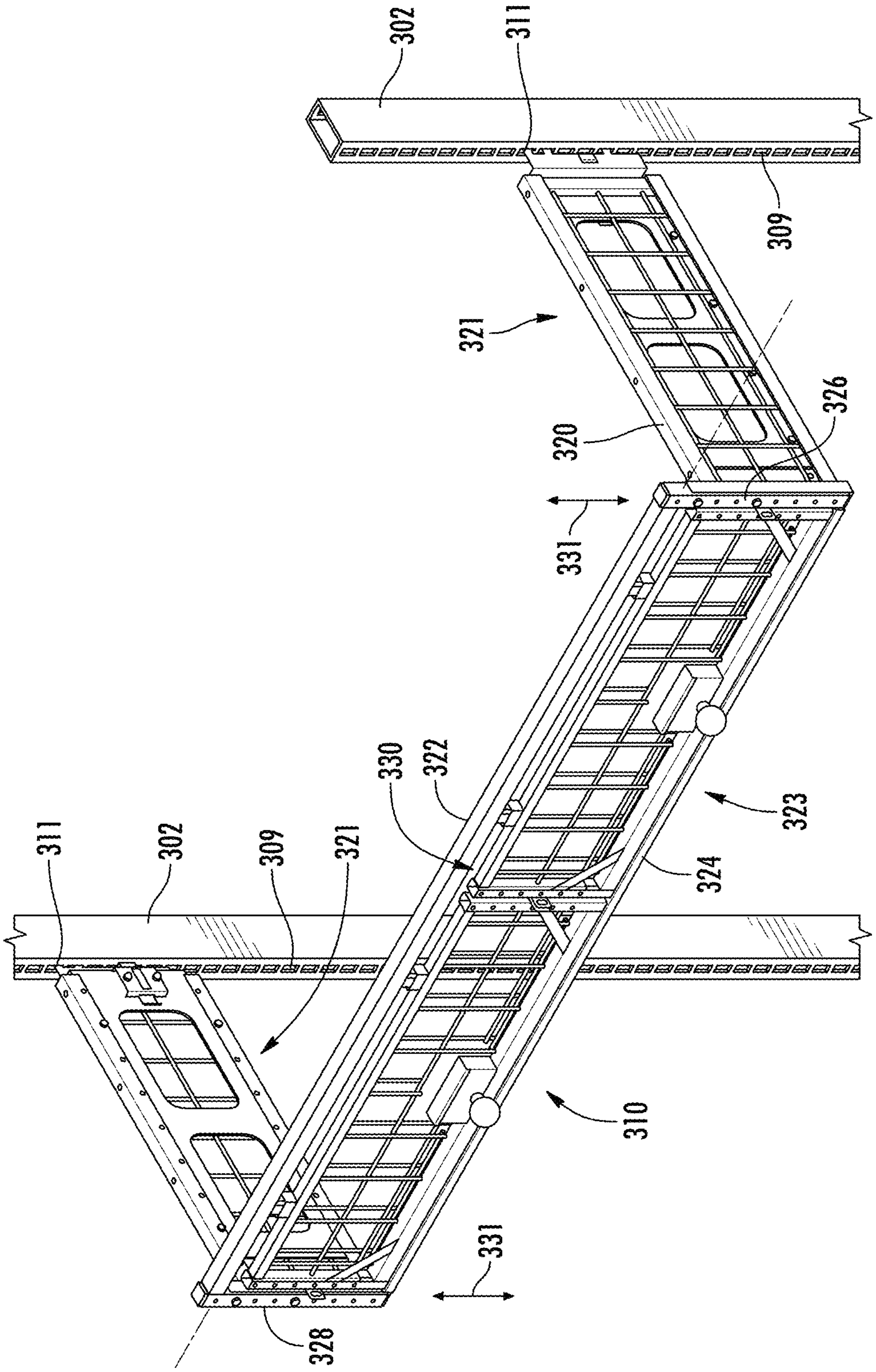
FIG. 20 is an illustration of the retail merchandise display of FIG. 18 with the back wall and shelves removed.
Figure 21:
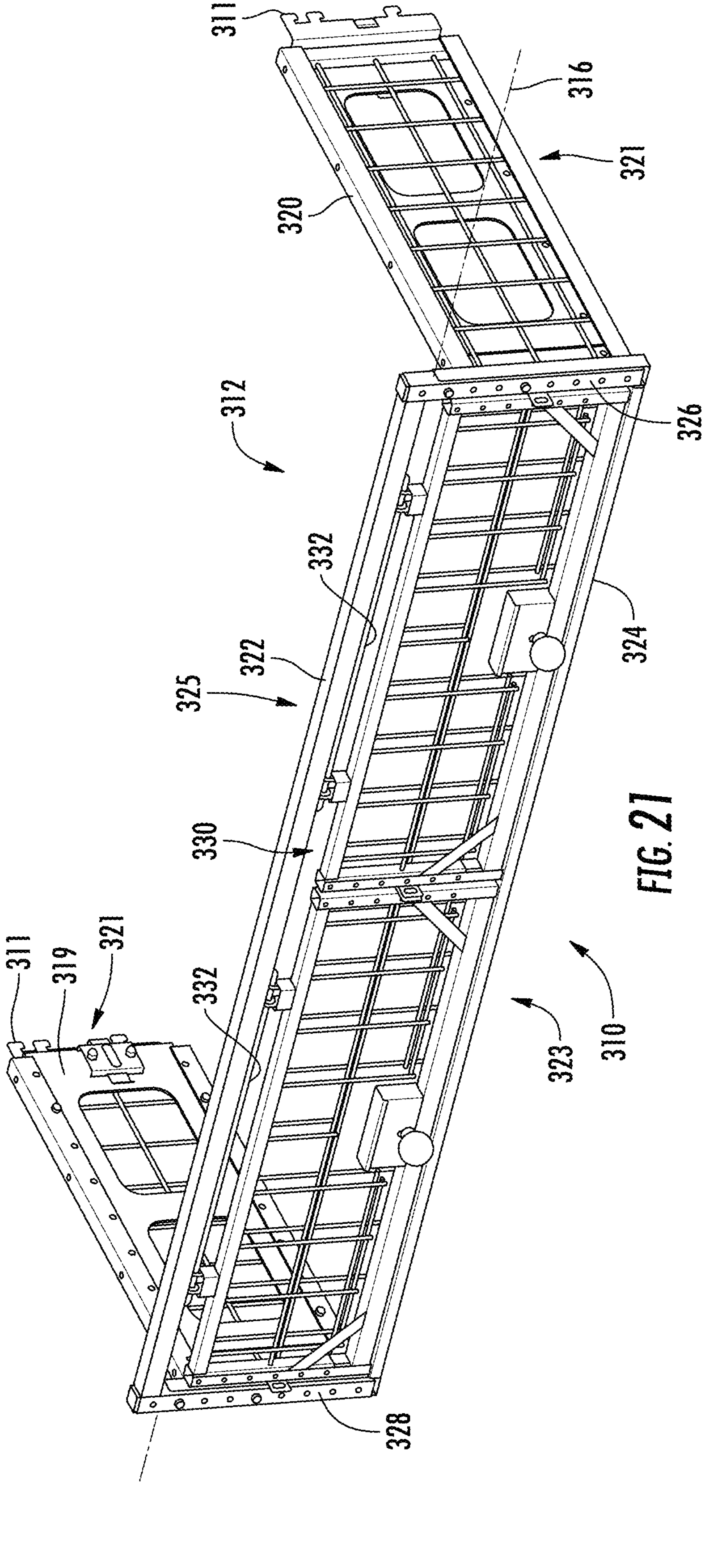
FIG. 21 is an illustration of the access gate of the retail merchandise display of FIG. 17.

FIGS. 19 and 21 illustrate the access gate assembly 310 removed from between the shelves 304 and from uprights 302. FIG. 20 illustrates the access gate assembly 310 mounted to the uprights 302 but with the shelves 304 removed.

Connectors in the form of hooks 311 are used to mount the access gate assembly 310 to the apertures 309 in the uprights 302.

The access gate assembly 310 provides selective access to the product storage region 312. In particular, the access gate assembly 310 includes one or more doors 314 that are operably rotatably mounted for rotation about axis 316 to allow for selective access to the product storage region 312. In this example, access gate assembly 310 includes a pair of doors 314.

In this example, the access gate assembly 310 includes a mounting frame 320 that is configured to be adjustably attached to the uprights 302 adjacent the product storage region 312. Adjustably attached herein includes allowing the mounting frame to be removed from the uprights 302 and then reattached at a different location relative to the uprights 302.

The mounting frame 320 includes a pair of side panels 321 and a front panel 323 that extends between the side panels 321.

The side panels 321 extend outward from the uprights 302 in cantilevered fashion and include the hooks 311 for mounting the access gate assembly 310 to the uprights. The hooks 311 are at a rear end of the side panels 321 while the front panel 323 is at a front end of the side panels 321.

The side panels 321 block access to the product storage region 312 from the sides of the shelving system 300.

The front panel 323 provides a frame 325 and doors 314. Frame 325 is substantially similar to frame 120 of the prior embodiment. However, in this example, frame 325 of front panel 320 is attached to side panels 321 rather than having the frame 325 attached to, for example, the shelves 304 above and below frame 325 when it is installed (see e.g. FIG. 17).

This configuration allows for easy modification of an existing shelving system that only has the uprights 302 and shelves 304 but does not include the access gate assembly 310.

The frame 325 includes a frame top rail 322, a frame bottom rail 324 spaced apart from the frame top rail 322, a first frame side rail 326 extending perpendicular to the frame top and frame bottom rails 322, 324 and a second frame side rail 328 extending perpendicular to the frame top and frame bottom rails 322, 324 and that is laterally spaced apart from the first frame side rail 326.

The frame rails 322, 324, 326, 328 generally defines an access opening 330 through which a user can access the product storage region 112.

Figure 22:
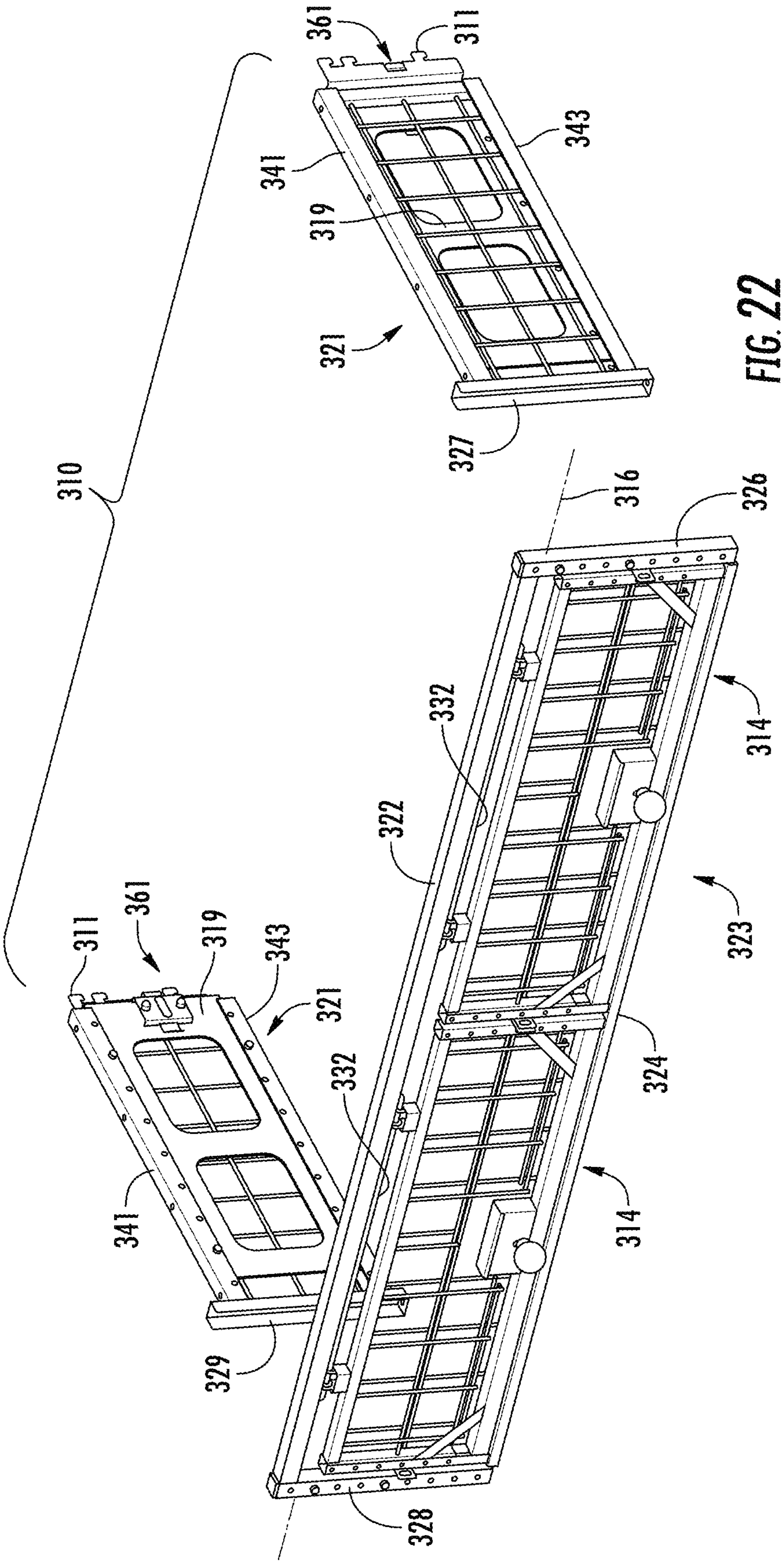
FIG. 22 is a partial exploded illustration of the access gate of FIG. 21.

As best seen in FIG. 22, the side panels 321 have U-shaped rails 327, 329 that are attached to and receive side rails 326, 328. Fasteners, such as nuts and bolts secure the corresponding rail 327, 329 to corresponding side rail 326, 328.

Bottom rail 324 is attached to and extends between the U-shaped rails 327, 329 of the side panels 321. The top rail 322 is attached to and extends between the side rails 326, 328.

In this example, the first and second frame side rails 326, 328 are adjustably positionable relative to U-shaped rails 327, 329 and the corresponding side panels (as represented by arrow 331 in FIGS. 20-22) to accommodate different shelf vertical spacing. This allows for adjusting the spacing between the frame top and frame bottom rails 322, 324.

Further, side panels 321 may be longitudinally adjustable to allow for use with different shelf depths. In addition to the wire grid work, the side panels 321 include panel members 319. The panel members 319 include hooks 311 for mounting the side panels 321.

Figure 24:
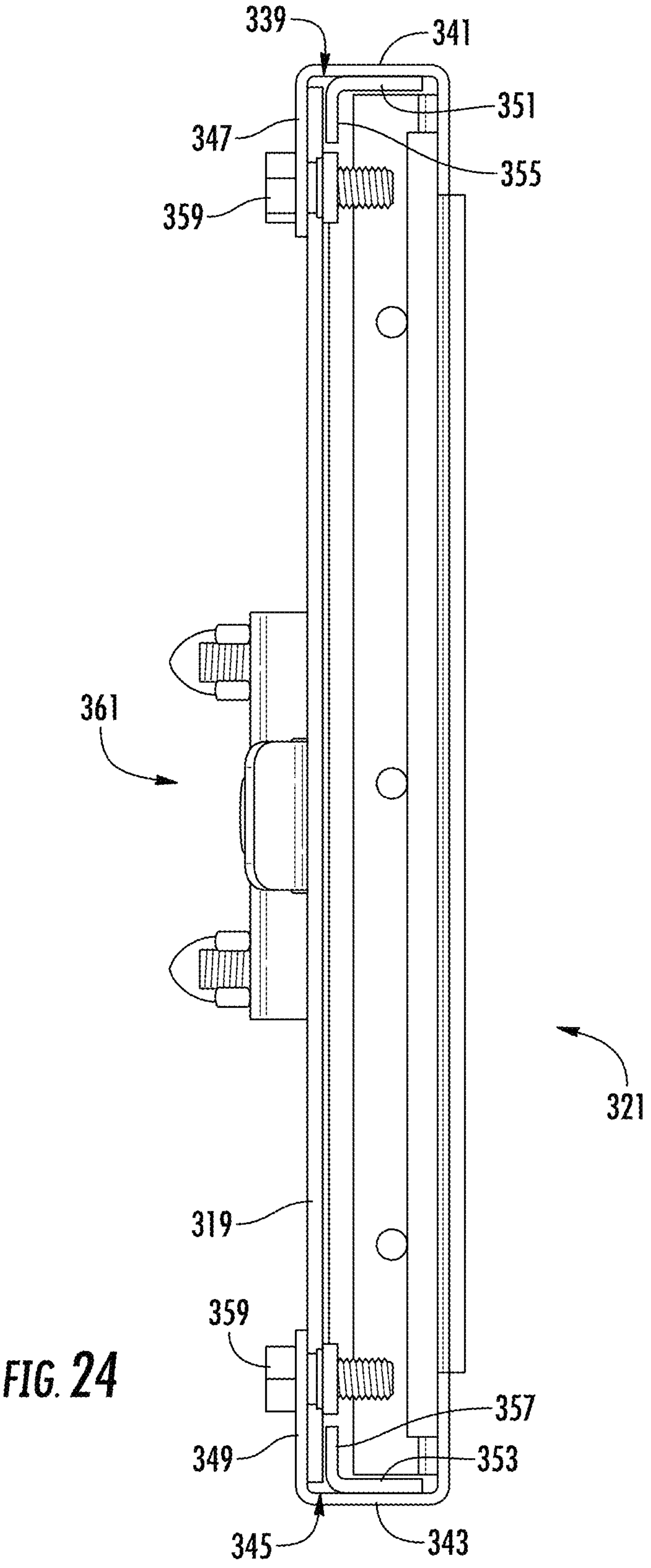
FIG. 24 is a cross-sectional illustration of a side panel of the access gate of FIG. 21.

As illustrated in FIG. 24, the panel members 319 are mounted in channels 339, 345 formed in the top and bottom rails 341, 343 of the side panels 321.

In this example, the top and bottom rails 341, 343 are U-shaped members. The panel members 319 are secured to inner legs 347, 349 of the U-shaped top and bottom rails 341, 343 by fasteners 359.

The channels 339, 345 are formed between the inner legs 347, 349 and upstanding legs 355, 357 of L-brackets 351, 353.

When the fasteners 359 are removed, the panel members 319 be adjustably positioned relative to and along top and bottom rails 341, 343 to adjust a length of the side panels 321.

Figure 25:
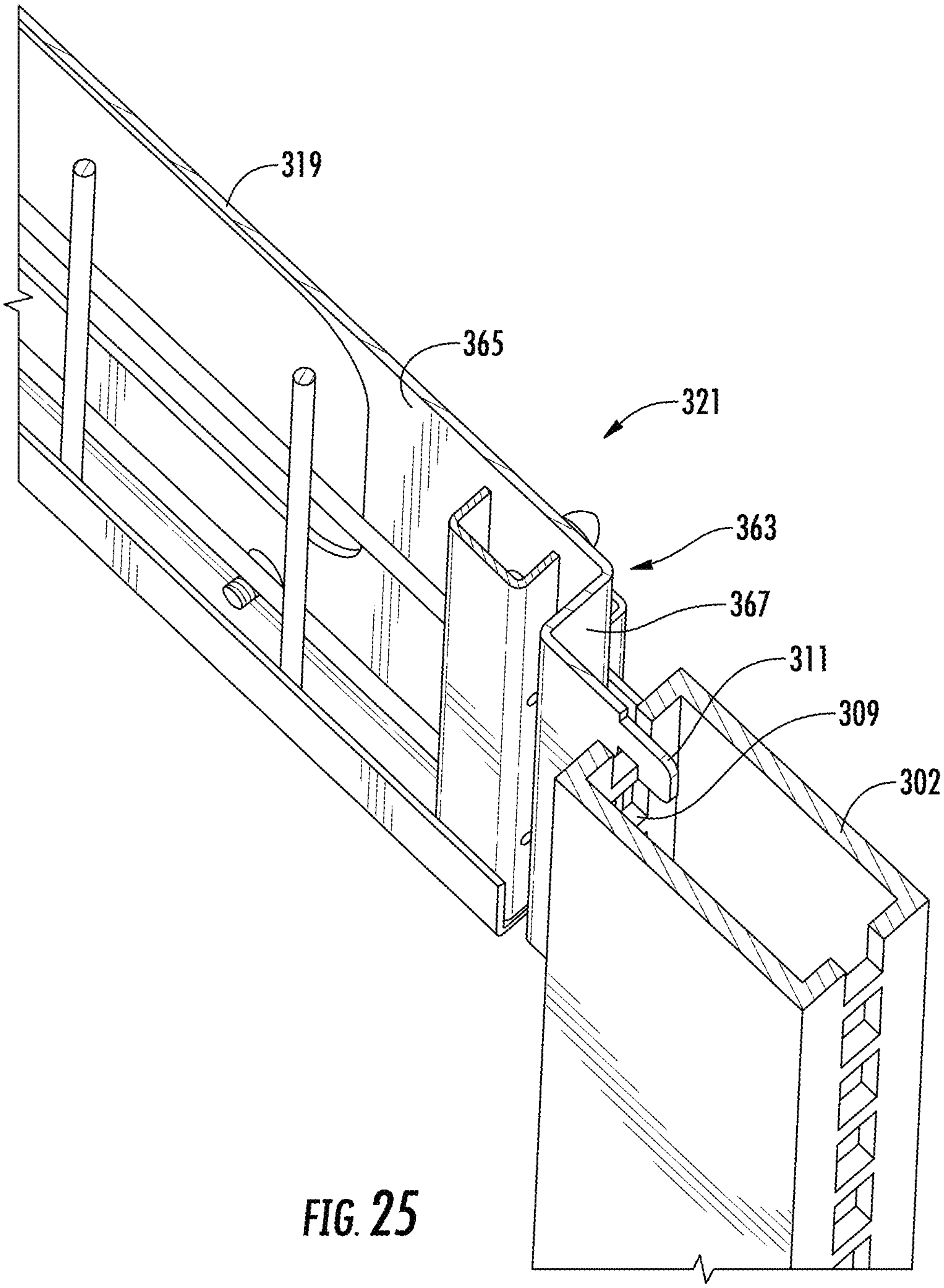
FIG. 25 is a cross-sectional illustration illustrating the mounting of the access gate to an upright.

With reference to FIG. 25, the panel members 319 have a Z-shaped bent region 363 that offsets the hooks 311 from the main panel portion 365 of the panel member 319. In this example, the z-shaped bent region 363 laterally offsets the hooks 311 outward relative to main panel portion 365. A laterally extending wall portion 367 extends laterally between the main panel portion 365 and the outer portion that includes hooks 311.

The side panels 321 carry latch arrangements 361. These latch arrangements 361 are used for locking the side panels 321 to the uprights 302. With the side panels 321 mounted to the uprights 302, the user can actuate the free end of the latch member into an aperture 309 of the upright. The latch member is sized relative to the aperture such that when the latch member is received in the apertures the latch member prevents the side panels 321 from being moved vertically, e.g. upwards. This prevents the hooks 311 from being moved vertically and prevents them from being disengaged from the portions of the upright 302 that are engaged by the hooks 311 (e.g. the portion below the corresponding aperture 309).

With reference to FIG. 21, the front panel 323 includes a pair of door mounting members 332 for mounting the doors 314. In this example, the door mounting members 332 are in the form of an elongated wire that has bent ends that are attached to and extend downward from top rail 322. The bent ends may be threaded and nuts used to secure to top rail 322, the bent ends may be welded to top rail 322 or other means for securing the components may be used.

The elongated portion of the door mounting members 332, e.g. the portion generally parallel to and spaced from top rail 322, defines axis 316. The doors 314 operably mount to the elongated portion of the door mounting members 332 for rotational motion about axis 316 and door mounting member 332.

Doors 314 are substantially identical to doors 114. Further doors 314 mount to door mounting members 332 in substantially the same way that doors 114 mount to door mounting member 132. As such, the details of doors 314 and the manner in which they are mounted will not be described in detail.

Figure 23:
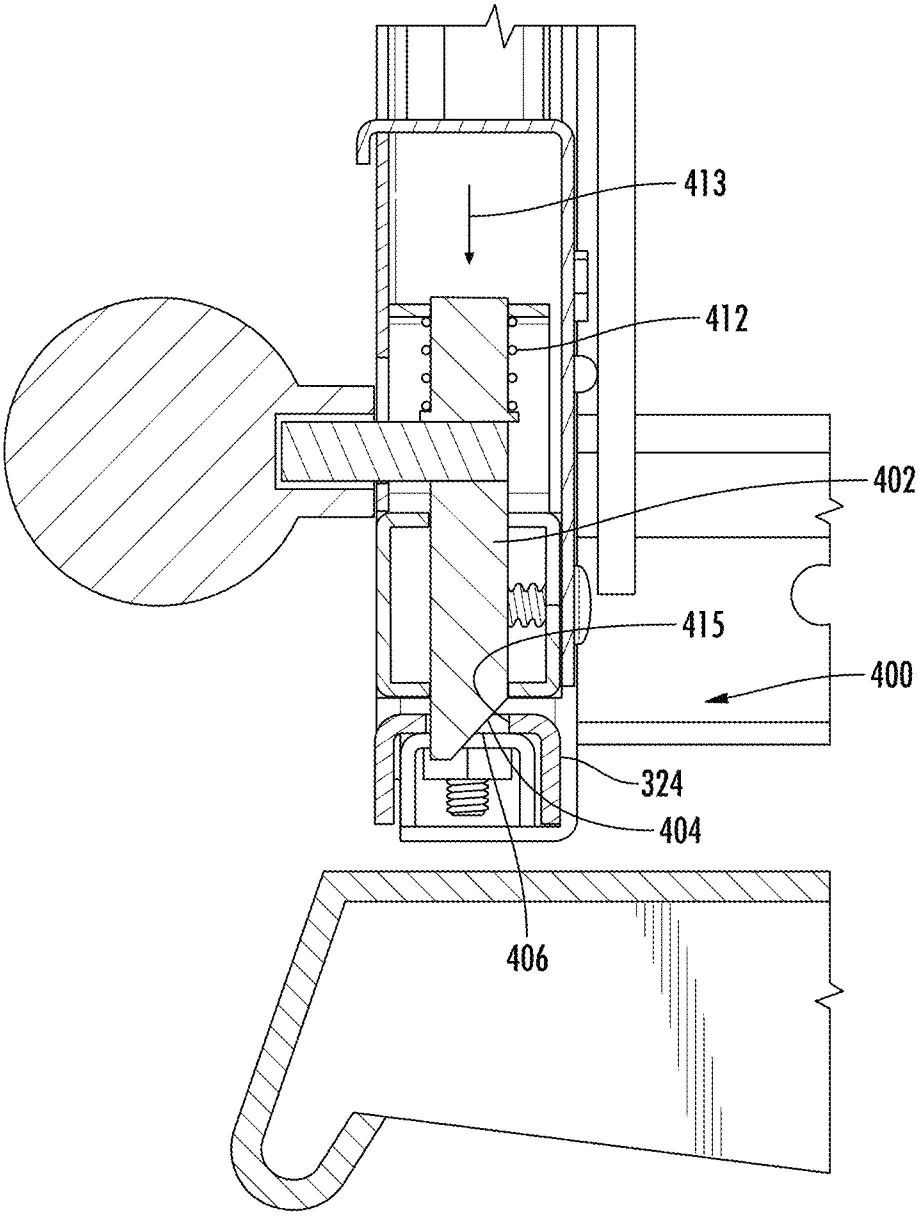
FIG. 23 is a cross-sectional illustration of a latch arrangement for a door of the access gate of FIG. 21.

With reference to FIG. 23, a latch arrangement 400 acts between the door 314 and the mounting frame 320. The latch arrangement 400 can prevent opening the door 314, e.g. pivoting it in the forward direction.

The latch arrangement 400 includes a latch 402 having a cam surface 404. The latch 404 is carried by the door 314. The latch arrangement 400 includes a strike region in the form of a catch aperture 406 provided by the mounting frame 320 and particularly in bottom rail 324.

The catch aperture 406 operates substantially similar to the strike member 208 of the prior example. However, in this example, the aperture provides some opposition to pushing the door inwards beyond the bottom rail 324.

In this example, when the door 314 is rotated from a pivoted forward position (e.g. an open position) and then transitioned to the closed position illustrated in FIG. 23 and the latch 402 aligns with aperture 406, the latch 402 is projected into aperture 406 due to biasing member 412 illustrated by arrow 413.

Once in the aperture 406, the latch will abut abutment portion 415 of bottom rail 324 forming the back side of aperture 406. This abutment will inhibit further of the door 314 inwards and into the storage region 312.

Operation of latch 402 can be manual or electronic and could be performed as outlined above for latch 202.

Also, the adjacent doors 314 can be locked to one another similar to doors 114 described above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An access gate assembly for a retail merchandise display having a frame defining a product storage region, the access gate comprising:

a mounting frame configured to be attached to a frame of a retail merchandise display adjacent the product storage region, the mounting frame including a door mounting member;

a door having:

a main panel having a front side and a rear side opposite the front side;

a first door mount attached to the main panel, the first door mount having a first mounting hook having a mounting slot including an open mouth facing in a rearward direction sized to receive a portion of the door mounting member into the mounting slot and permitting the first door mount to rotate about the door mounting member; and a U-shaped spring clip that attaches to the first mounting hook preventing the first mounting hook from being removed from the door mounting member.

2. The access gate assembly of claim 1, wherein the spring clip is attachable to the first mounting hook from the front side of the main panel.

3. The access gate assembly of claim 1, wherein the main panel has a top side, the first door mount extending outward from the top side of the main panel.

4. The access gate assembly of claim 1, wherein the main panel has an adjustable height, the height being perpendicular to an axis defined by the door mounting member about which the first mounting hook rotates.

5. The access gate assembly of claim 1, wherein:

the mounting slot includes a first portion extending along a first axis, the first portion including the mouth;

the mounting slot includes a second portion connected to the first portion, the second portion extending along a second axis that is non-parallel to the first axis such that at least part of the second portion is offset from the first portion, the second portion being offset forward of the mouth;

the door mounting member being located within the second portion in an assembled state.

6. The access gate assembly of claim 1, wherein the clip has spaced apart opposed and connected legs, each leg having a connection tab extending inward, the connection tab engaging an inner side of the first door mount to secure the clip to the first door mount.

7. The access gate assembly of claim 6, wherein at least one of the connection tabs extends across and blocks at least a portion of the mouth of the mounting slot.

8. The access gate of claim 5, wherein the first mounting hook is mounted to the door mounting member by moving the door mounting member within the first portion of the mounting slot relative to the first mounting hook along the first axis in a forward direction and then moving the door mounting member within the second portion of the mounting slot relative to the first mounting hook along the second axis away from the first axis and away from the main panel.

9. The access gate assembly of claim 1, wherein the portion of the door mounting member received in the mounting slot has a round periphery.

10. An access gate assembly for a retail merchandise display having a frame defining a product storage region, the access gate comprising:

a mounting frame configured to be attached to a frame of a retail merchandise display adjacent the product storage region, the mounting frame including a door mounting member;

a door having:

a main panel having a front side and a rear side opposite the front side;

a first door mount attached to the main panel, the first door mount having a first mounting hook having a mounting slot including an open mouth facing in a rearward direction sized to receive a portion of the door mounting member into the mounting slot and permitting the first door mount to rotate about the door mounting member, the mounting slot including a first portion extending along a first axis, the first portion including the mouth, the mounting slot including a second portion connected to the first portion, the second portion extending along a second axis that is non-parallel to the first axis such that at least part of the second portion is offset from the first portion, the second portion being offset forward of the mouth, the door mounting member being located within the second portion in an assembled state;

a locking clip attached to the first mounting hook, the locking clip preventing the door mounting member from moving along the second axis within the second portion of the mounting slot to the first portion of the of the mounting slot;

wherein:

the first mounting hook is mounted to the door mounting member by moving the door mounting member within the first portion of the mounting slot relative to the first mounting hook along the first axis in a forward direction and then moving the door mounting member within the second portion of the mounting slot relative to the first mounting hook along the second axis away from the first axis and away from the main panel.

11. An access gate assembly for a retail merchandise display having a frame defining a product storage region, the access gate comprising:

a mounting frame configured to be attached to a frame of a retail merchandise display adjacent the product storage region, the mounting frame including a door mounting member;

a door having:

a main panel having a front side and a rear side opposite the front side;

a first door mount attached to the main panel, the first door mount having a first mounting hook having a mounting slot including an open mouth facing in a rearward direction sized to receive a portion of the door mounting member into the mounting slot and permitting the first door mount to rotate about the door mounting member; and wherein the mounting frame includes:

a first frame rail member having a front panel, the door mounting member mounted adjacent the first frame rail member and rearward of the front panel, the front panel defining a cutout region exposing the portion of the door mounting member to which the first mounting hook is attached, the first mounting hook located within the cutout region when mounted to the door mounting member.

12. The access gate assembly of claim 11, wherein the door includes a second door mount attached to the main panel, the second door mount having a first mounting hook having an open mouth facing in a rearward direction sized to receive a portion of the door mounting member therein and permitting the second door mount to rotate about the door mounting member.

13. The access gate assembly of claim 11, wherein:

the first frame rail member includes a top panel that extends rearward from the front panel, the front panel and top panel forming an L-shaped member;

the top panel preventing insertion of the door mounting member into the mouth of the mounting slot unless the first mounting hook is oriented such that an insertion axis of the mouth of the mounting slot is non-parallel to the top panel and the mouth is directed towards the top panel.

14. The access gate assembly of claim 11, wherein:

the main panel hangs in a generally vertical orientation when mounted to the door mounting member; and the top panel prevents the first mounting hook to be mounted to the door mounting member with the main panel in the generally vertical orientation.

15. An access gate assembly for a retail merchandise display having a frame defining a product storage region, the access gate comprising:

a mounting frame configured to be attached to a frame of a retail merchandise display adjacent the product storage region, the mounting frame including a door mounting member;

a door having:

a main panel having a front side and a rear side opposite the front side;

a first door mount attached to the main panel, the first door mount having a first mounting hook having a mounting slot including an open mouth facing in a rearward direction sized to receive a portion of the door mounting member into the mounting slot and permitting the first door mount to rotate about the door mounting member;

wherein:

the mounting frame includes a frame top rail, a frame bottom rail spaced apart from the frame top rail, a first frame side rail extending between the frame top and frame bottom rails and a second frame side rail extending between the frame top and frame bottom rails and being spaced apart from the first frame side rail; and the length of the first and second frame side rails being adjustable to allow for adjustable spacing of the frame top and frame bottom rails.

16. The access gate assembly of claim 15, wherein the main panel has a first panel portion and a second panel portion, the first panel portion being movable relative to the second panel portion to adjust a height of the main panel.

17. The access gate assembly of claim 16, wherein:

the main panel includes a panel frame, the panel frame includes a panel top rail, a panel bottom rail spaced apart from the panel top rail, a first panel side rail extending between the panel top and panel bottom rails and a second panel side rail extending between the panel top and panel bottom rails and being spaced apart from the first panel side rail; and the length of the first and second panel side rails is adjustable to allow for adjustable spacing of the panel top and panel bottom rails;

the first panel portion is fixed relative to the panel top rail;

the second panel portion being fixed relative to the panel bottom rail such that adjusting the spacing of the panel top and panel bottom rails adjusts the relative positions of the first and second panel portions.

18. An access gate assembly for a retail merchandise display having a frame defining a product storage region, the access gate comprising:

a mounting frame configured to be attached to a frame of a retail merchandise display adjacent the product storage region, the mounting frame including a door mounting member;

a door having:

a main panel having a front side and a rear side opposite the front side;

a first door mount attached to the main panel, the first door mount having a first mounting hook having a mounting slot including an open mouth facing in a rearward direction sized to receive a portion of the door mounting member into the mounting slot and permitting the first door mount to rotate about the door mounting member;

a latch arrangement including a latch having a cam surface carried by the door, the mounting frame having a strike region; the cam surface being tapered to drive the latch upward when contacting the strike and to permit passage of the latch when the door swings about the door mounting member in an inward direction, the latch abutting the strike when the door swings about the door mounting member in an outward direction and preventing further motion in the outward direction.

19. The access gate assembly of claim 18, further comprising a clip attached to the first mounting hook, the clip securing the first mounting hook to the door mounting member and preventing the door mounting member from being removed from the mounting slot.

20. The access gate assembly of claim 18, wherein the latch is biased toward an extended position and is compressed to a compressed position when the cam surface slides along and contacts the strike region; the latch being driveable against the biasing to move the latch to permit the latch to swing past the strike region in the outward direction.

21. The access gate assembly of claim 20, wherein the latch is electronically driveable by an electronic actuator to the compressed position.

22. The access gate assembly of claim 20, wherein the latch includes a manually manipulatable handle that can be driven by a user to manually transition the latch to the compressed position.

23. The access gate assembly of claim 18, wherein the strike region includes an aperture that receives the latch, when the door is in a closed orientation.

24. The access gate assembly of claim 23, wherein when the latch extends into the aperture, the latch is inhibited from moving in an outward direction or an inward direction.

25. The access gate assembly of claim 18, wherein the mounting frame includes a front panel and a pair of side panels extending rearward relative to the front panel;

the door being mounted to the front panel;

the side panels having mounting members for releasably attaching the mounting frame to the frame of the retail merchandise display.

26. The access gate assembly of claim 25, wherein the mounting members are hooks for mounting to a vertically spaced array of apertures of uprights for a gondola shelving system.

27. A retail merchandise display comprising:

a racking system comprising:

first and second spaced apart upright frames;

first and second racking beams extending between and connected to the first and second upright frames in a vertically spaced orientation;

a product support deck positioned rearward of the second racking beam and vertically offset from the first racking beam, the product support deck defining a product storage region thereabove, the product storage region being rearward of the first and second racking beams; and an access gate assembly of claim 18 mounted vertically between the first and second racking beams, the access gate assembly providing selective access to the product storage region.

28. The retail merchandise display of claim 27, wherein the frame of the access gate assembly is directly fastened to at least one of the first and second racking beams.

29. A retail merchandise display comprising:

a gondola shelving system comprising:

first and second spaced apart uprights, each upright having a plurality of mounting apertures in a front face thereof;

first and second shelves mounted to the first and second apart uprights in a cantilevered orientation, the first and second shelves being vertically spaced apart, the first shelf being below the second shelf and defining a product storage region thereabove; and an access gate assembly of claim 18 mounted to the first and second spaced apart uprights in a cantilevered orientation vertically between the first and second shelves, the access gate assembly providing selective access to the product storage region.

30. The retail merchandise display of claim 29, wherein the access gate assembly is not directly fastened to the first and second shelves.

31. The retail merchandise display of claim 30, wherein a portion of the weight of the access gate assembly is supported by the first shelf.

32. The retail merchandise display of claim 29, wherein the top and bottom of the product storage region is defined by the first and second shelves and is not provided by a component mounted to the frame of the access gate assembly.

* * * * *